(12) United States Patent
Kawakami et al.

(10) Patent No.: US 8,754,549 B2
(45) Date of Patent: Jun. 17, 2014

(54) POWER CONVERSION DEVICE

(75) Inventors: Tomoyuki Kawakami, Tokyo (JP); Akihiko Iwata, Tokyo (JP); Tatsuya Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 688 days.

(21) Appl. No.: 13/055,153

(22) PCT Filed: Jul. 23, 2009

(86) PCT No.: PCT/JP2009/003471
§ 371 (c)(1),
(2), (4) Date: Jan. 21, 2011

(87) PCT Pub. No.: WO2010/010710
PCT Pub. Date: Jan. 28, 2010

(65) Prior Publication Data
US 2011/0121661 A1 May 26, 2011

(30) Foreign Application Priority Data

Jul. 24, 2008 (JP) .................. 2008-190442
Oct. 8, 2008 (JP) .................. 2008-261420

(51) Int. Cl.
| | | |
|---|---|---|
| *H02M 3/18* | (2006.01) | |
| *H02J 7/35* | (2006.01) | |
| *G05F 1/67* | (2006.01) | |
| *H02M 3/07* | (2006.01) | |
| *H02J 7/34* | (2006.01) | |

(52) U.S. Cl.
CPC ... *G05F 1/67* (2013.01); *H02J 7/35* (2013.01); *Y02E 10/58* (2013.01); *H02M 3/07* (2013.01); *H02J 7/345* (2013.01)
USPC ........................................... 307/110

(58) Field of Classification Search
USPC .......................................................... 307/110
See application file for complete search history.

(56) References Cited

U.S. PATENT DOCUMENTS 5,095,223 A * 3/1992 Thomas ..................... 307/110
5,463,542 A * 10/1995 Okamoto ..................... 363/60
(Continued)

FOREIGN PATENT DOCUMENTS

| JP | 11 299226 | 10/1999 |
| JP | 2001 309643 | 11/2001 |

(Continued)

OTHER PUBLICATIONS

International Search Report issued Sep. 8, 2009 in PCT/JP09/003471 filed Jul. 23, 2009.

(Continued)

*Primary Examiner* — Jared Fureman
*Assistant Examiner* — Duc M Pham
(74) *Attorney, Agent, or Firm* — Oblon, Spivak, McClelland, Maier & Neustadt, L.L.P.

(57) ABSTRACT

In a power conversion device which performs DC/DC conversion, an inverter circuit (20), which is formed of one or more single-phase inverters (20*a*) and (20*b*) connected in series to each other, is connected in series to a DC power supply (1) in its subsequent stage. In further subsequent stage, a smoothing capacitor (6) connected to the inverter circuit (20) via a rectifier diode (5), and a shorting switch (4) which bypasses the smoothing capacitor (6) are provided. The shorting switch (4) is switched ON to charge capacitors (25) and (35) included in the single-phase inverter (20*a*) and (20*b*), respectively, whereas the shorting switch (4) is switched OFF to discharge the capacitors (25) and (35), whereby the voltage of the smoothing capacitor (6) is controlled.

21 Claims, 35 Drawing Sheets

(56) References Cited

U.S. PATENT DOCUMENTS

| | | | | |
|---|---|---|---|---|
| 6,037,755 | A | * | 3/2000 | Mao et al. ............ 323/222 |
| 6,084,789 | A | | 7/2000 | Van Lieshout |
| 7,327,638 | B2 | | 2/2008 | Nagata |
| 7,847,494 | B2 | * | 12/2010 | Bastholm ............ 318/34 |
| 2004/0037100 | A1 | * | 2/2004 | Orr et al. ............ 363/131 |

FOREIGN PATENT DOCUMENTS

| | | |
|---|---|---|
| JP | 2002 506609 | 2/2002 |
| JP | 2002 262546 | 9/2002 |
| JP | 2005-223867 A | 8/2005 |
| JP | 2006 14418 | 1/2006 |
| JP | 39 41346 | 4/2007 |
| WO | WO 02/063758 A1 | 8/2002 |

OTHER PUBLICATIONS

Office Action issued Aug. 29, 2013 in German Patent Application No. 11 2009 001 793.2 with English language translation.

\* cited by examiner

Case A2

Case A3

| | | | | | | |
|---|---|---|---|---|---|---|
| A1 | CHARGE | ON | 60V | -60V | --- | |
| A2 | CHARGE | ON | 60V | +60V | -120V | |
| A3 | DISCHARGE | OFF | 60V | +60V | +120V | 240V |
| B1 | CHARGE | ON | 120V | --- | -120V | |
| B2 | DISCHARGE | OFF | 120V | --- | +120V | 240V |
| C1 | CHARGE | ON | 180V | -60V | -120V | |
| C2 | DISCHARGE | OFF | 180V | +60V | --- | 240V |
| C3 | DISCHARGE | OFF | 180V | -60V | +120V | 240V |

FIG.27

| | | | | | |
|---|---|---|---|---|---|
| A | 50V | 50V | 100V | 200V | x 4.0 |
| A | 60V | 60V | 120V | 240V | x 4.0 |
| B | 70V | 70V | 140V | 210V | x 3.0 |
| B | 80V | 80V | 160V | 240V | x 3.0 |
| C | 90V | 30V | 60V | 180V | x 2.0 |
| C | 105V | 35V | 70V | 210V | x 2.0 |
| C | 120V | 40V | 80V | 240V | x 2.0 |
| D | 135V | 45V | 90V | 180V | x 1.3 |
| D | 150V | 50V | 100V | 200V | x 1.3 |
| D | 165V | 55V | 110V | 220V | x 1.3 |
| D | 180V | 60V | 120V | 240V | x 1.3 |

FIG.32

| | | | | | |
|---|---|---|---|---|---|
| A | 50V | 50V | 100V | 200V | x 4.0 |
| A | 60V | 60V | 120V | 240V | x 4.0 |
| B | 70V | 70V | 140V | 210V | x 3.0 |
| B | 80V | 80V | 160V | 240V | x 3.0 |
| C | 90V | 30V | 60V | 180V | x 2.0 |
| C | 105V | 35V | 70V | 210V | x 2.0 |
| C | 120V | 40V | 80V | 240V | x 2.0 |
| E | 130V | 65V | 65V | 195V | x 1.5 |
| E | 140V | 70V | 70V | 210V | x 1.5 |
| E | 150V | 75V | 75V | 225V | x 1.5 |
| E | 160V | 80V | 80V | 240V | x 1.5 |
| D | 165V | 55V | 110V | 220V | x 1.3 |
| D | 180V | 60V | 120V | 240V | x 1.3 |

POWER CONVERSION DEVICE

TECHNICAL FIELD

The present invention relates to a power conversion device that converts a DC power of a DC power supply into a DC power having a different voltage.

BACKGROUND ART

Booster circuits functioning as a conventional power conversion device are configured with a switching device, an inductor, a diode, and a smoothing electrolytic capacitor that is provided to the output side. An input voltage from a solar battery, which is smoothed by a smoothing electrolytic capacitor provided to the input side, is given to an inverter circuit in the subsequent stage, after being boosted by switching ON/OFF of the switching device of a booster circuit, or after passing therethrough without being boosted (for example, see Patent Literature 1).
[Patent Literature 1] Japanese Patent No. 3941346

DISCLOSURE OF THE PRESENT INVENTION

Problems to be Solved by the Present Invention

In such a power conversion device, a reactor having a larger capacity is required, with increase in an amount of output power, resulting in a problem of increase in size or weight of the device. In addition, high frequency switching by a switching device for the sake of avoiding the above-described problem causes enormous loss and noise.

The present invention has been made to solve the above-described problems, and an object of the present invention is to reduce power loss and noise in power conversion devices which perform DC/DC conversion, and to facilitate downsizing and weight saving of the devices.

Solution to the Problems

A power conversion device of the present invention comprises: an inverter circuit including one or more single-phase inverters which each include at least one semiconductor switch device and a DC voltage source and which are connected in series at their AC sides, and having an AC side connected in series to an output of a DC power supply thereby to superimpose a total sum of outputs of the single-phase inverters onto an output of the DC power supply; a smoothing capacitor smoothing an output from the inverter circuit which is connected to the inverter circuit in its subsequent stage via an element for switching between conduction and non-conduction; and a shorting switch which has one end connected to the inverter circuit, and the other end connected to a negative terminal of the smoothing capacitor. DC/DC conversion is performed by utilizing charge/discharge of DC power in the inverter circuit.

Effect of the Present Invention

According to the present invention, DC/DC conversion is performed by utilizing charge/discharge of DC power in the inverter circuit, and thus no large-capacity reactor is required. In addition, since the shorting switch and the semiconductor switch devices in the inverter circuit need not perform high frequency switching, a relatively low voltage can be used as a voltage for switching in the inverter circuit. Thus, it is possible to realize a power conversion device that facilitates reduction in power loss and noise, and also facilitates downsizing and weight saving of the device.

BRIEF DESCRIPTION OF THE DRAWINGS

FIG. 27 is a diagram showing a list of operations of the power conversion device according to embodiment 5 of the present invention.

FIG. 32 is a diagram showing a list of operations of the power conversion device according to embodiment 6 of the present invention.

FIG. 35 is a diagram showing possible voltage levels of the total output voltage of an inverter circuit according to embodiment 7 of the present invention.

FIG. 36 is a diagram showing possible voltage levels of the total output voltage of the inverter circuit according to embodiment 7 of the present invention.

BEST MODE FOR CARRYING OUT THE PRESENT INVENTION

Embodiment 1

Figure 1:
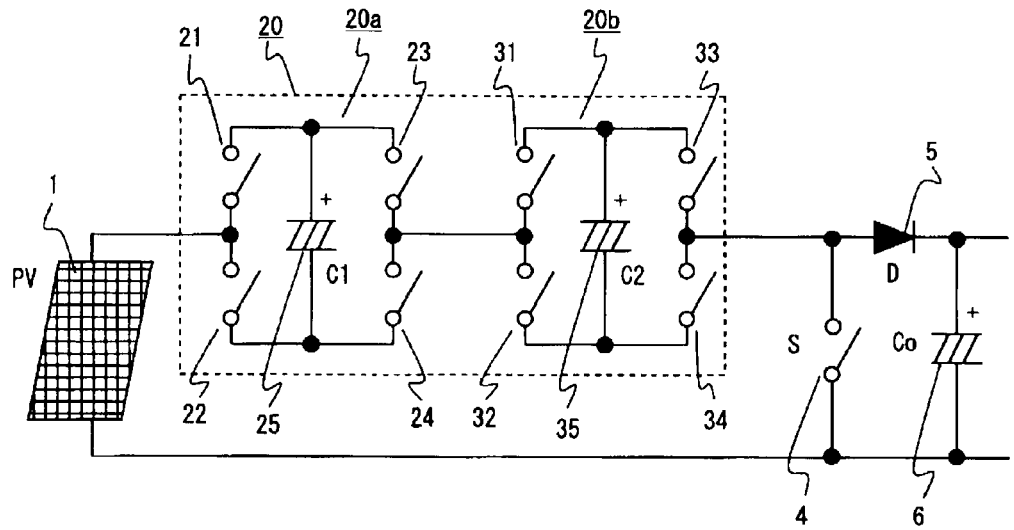
FIG. 1 is a configuration diagram of a main circuit of a power conversion device according to embodiment 1 of the present invention.

Hereinafter, a power conversion device according to embodiment 1 of the present invention will be described. FIG. 1 is a configuration diagram of a main circuit of the power conversion device according to embodiment 1 of the present invention.

As illustrated in FIG. 1, to the output of a DC power supply 1 formed of a solar battery or the like, an AC side of an inverter circuit 20 is connected in series. The inverter circuit 20 is composed of a first single-phase inverter 20a and a second single-phase inverter 20b with their AC sides connected in series to each other, and superimposes, as an output from the inverter circuit 20, a total sum of outputs from the single-phase inverters 20a and 20b onto a DC voltage of the DC power supply 1. The first single-phase inverter 20a of the inverter circuit 20 includes semiconductor switch devices 21 to 24 and a first capacitor 25 functioning as a DC voltage source, whereas the second single-phase inverter 20b of the inverter circuit 20 includes semiconductor switch devices 31 to 34 and a second capacitor 35 functioning as a DC voltage source. Here, as the semiconductor switch devices 21 to 24, and 31 to 34, an IGBT (Insulated Gate Bipolar Transistor) having an inverse-parallel diode, or a MOSFET (Metal Oxide Semiconductor Field Effect Transistor) having a built-in body-diode arranged between the source and drain is used.

In addition, a shorting switch 4 and a rectifier diode 5 which is an element for switching between conduction and non-conduction are connected with the stage subsequent to the inverter circuit 20. The cathode side of the rectifier diode 5 is connected to the positive terminal of the smoothing capacitor 6 in the output stage. Here, a connection point between one end of the shorting switch 4 and the anode of the rectifier diode 5 is connected to an AC output line in the stage subsequent to the inverter circuit 20, and the other end of the shorting switch 4 is connected to the negative terminal of the smoothing capacitor 6. In addition, the shorting switch 4 may be a semiconductor switch device such as an IGBT and a MOSFET, or a mechanical switch, or the like.

Figure 2:
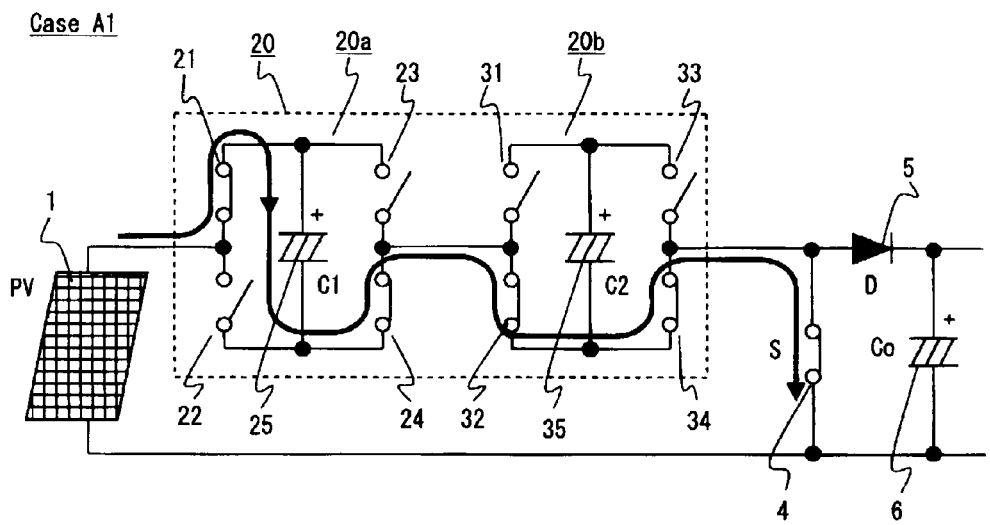
FIG. 2 is a circuit diagram illustrating an operation of the power conversion device according to embodiment 1 of the present invention.
Figure 3:
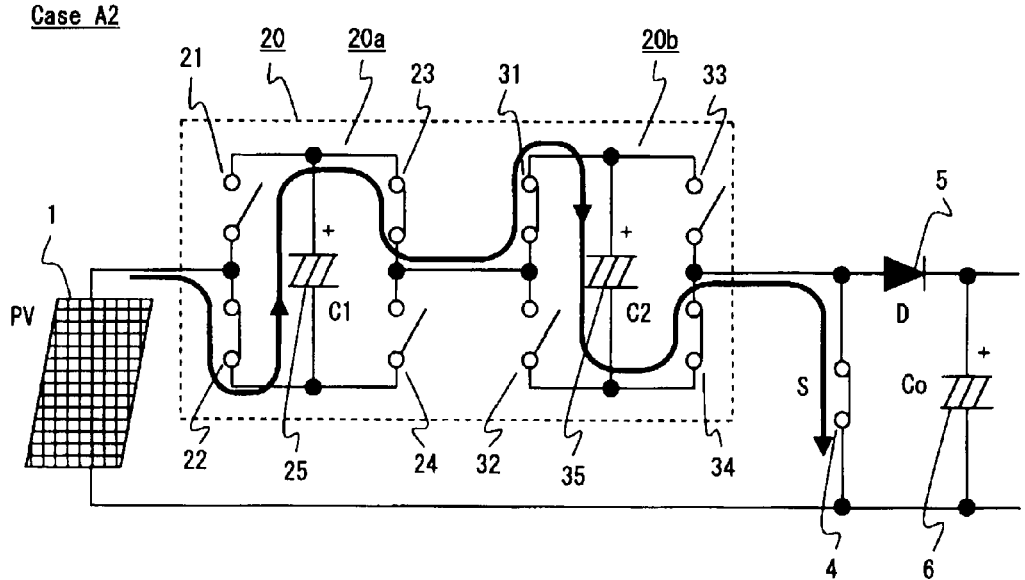
FIG. 3 is a circuit diagram illustrating an operation of the power conversion device according to embodiment 1 of the present invention.
Figure 4:
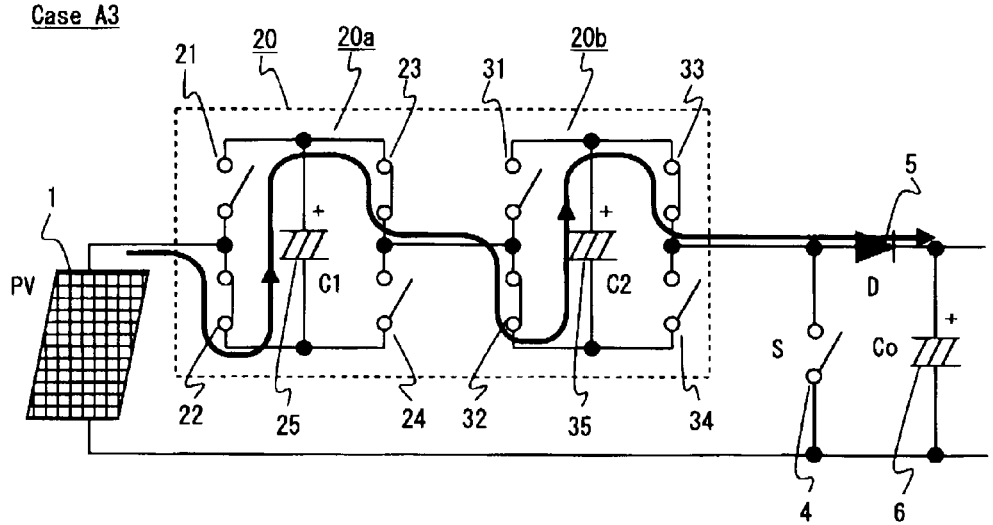
FIG. 4 is a circuit diagram illustrating an operation of the power conversion device according to embodiment 1 of the present invention.
Figure 5:
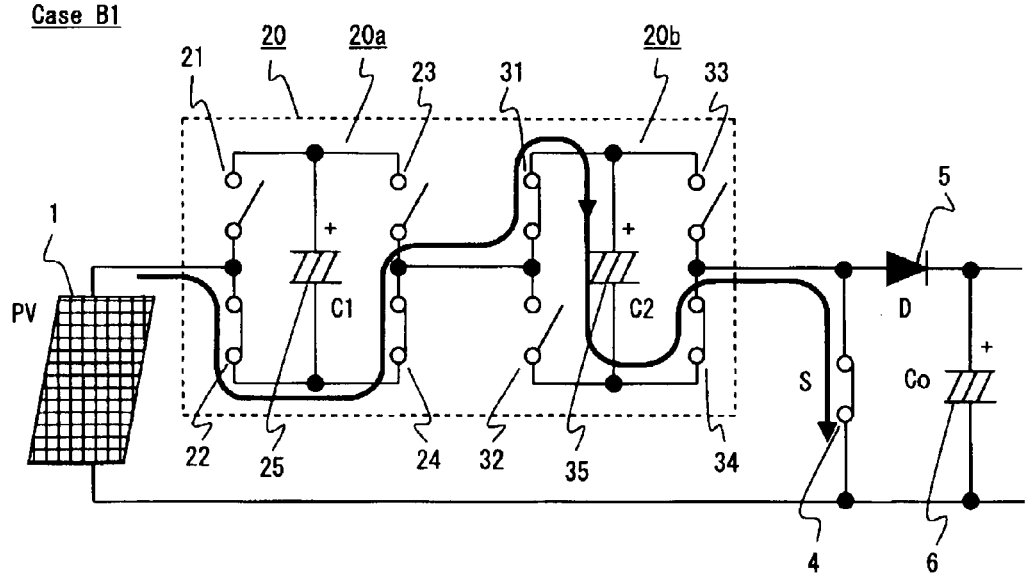
FIG. 5 is a circuit diagram illustrating an operation of the power conversion device according to embodiment 1 of the present invention.
Figure 6:
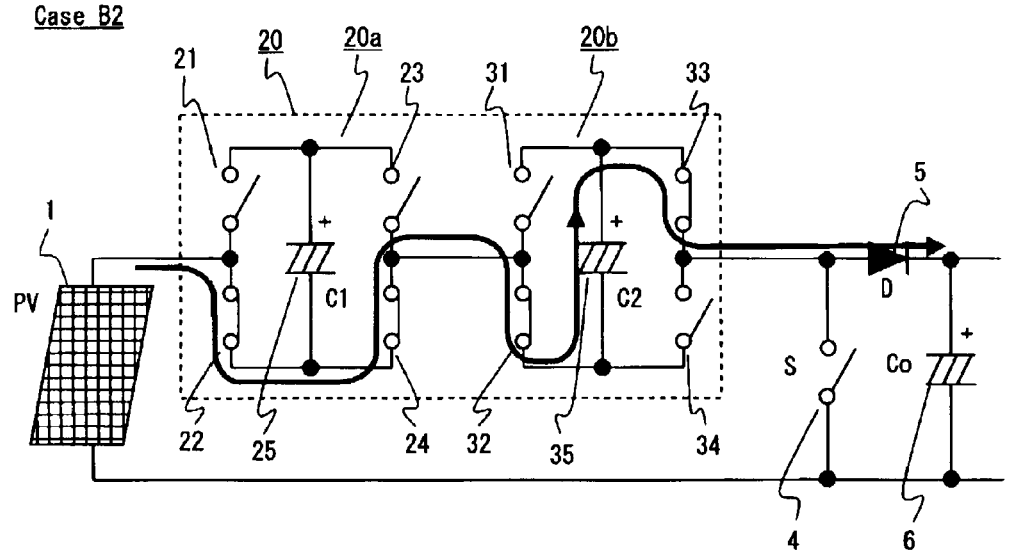
FIG. 6 is a circuit diagram illustrating an operation of the power conversion device according to embodiment 1 of the present invention.
Figure 7:
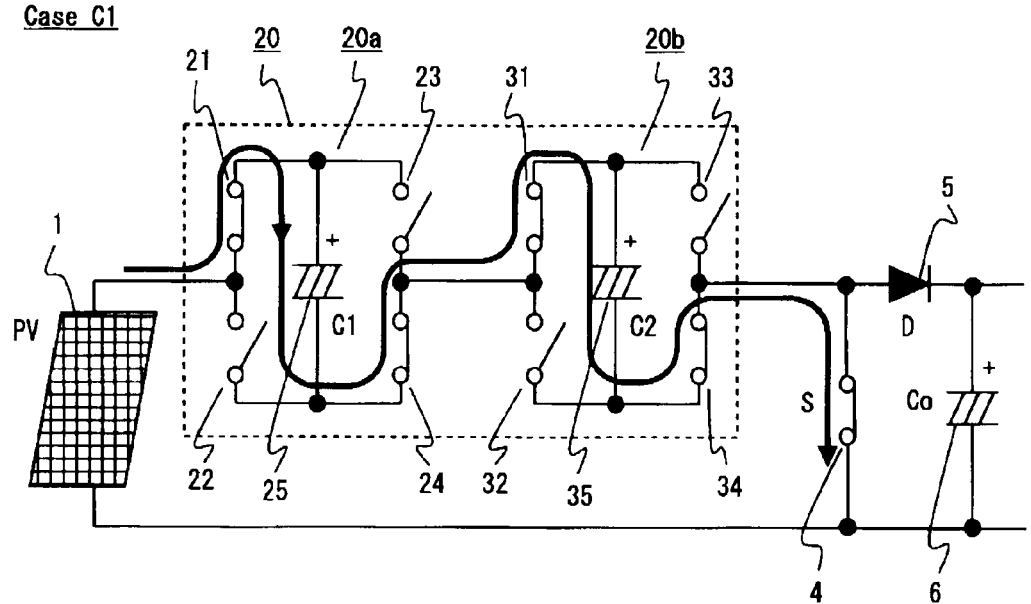
FIG. 7 is a circuit diagram illustrating an operation of the power conversion device according to embodiment 1 of the present invention.
Figure 8:
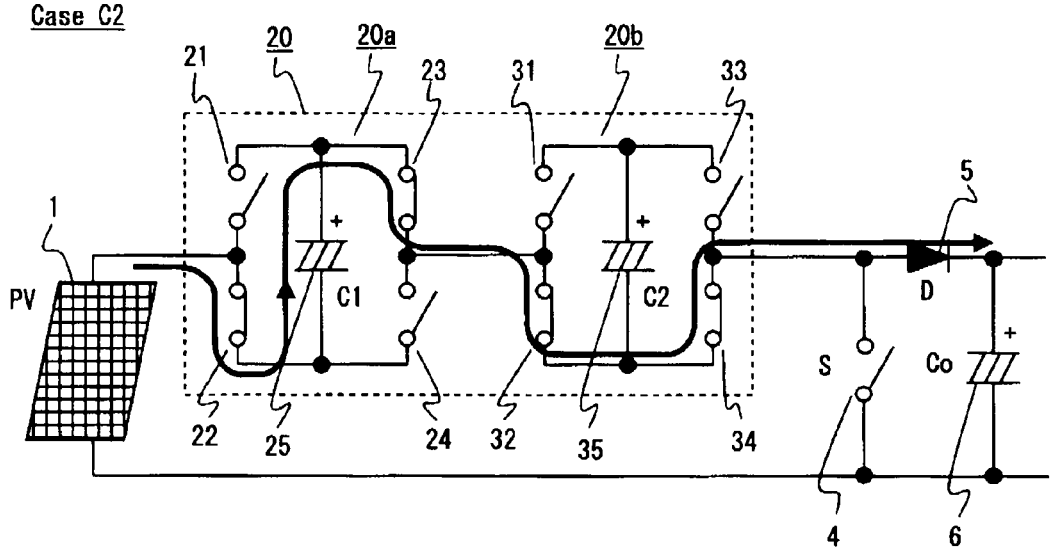
FIG. 8 is a circuit diagram illustrating an operation of the power conversion device according to embodiment 1 of the present invention.
Figures 9, 10:
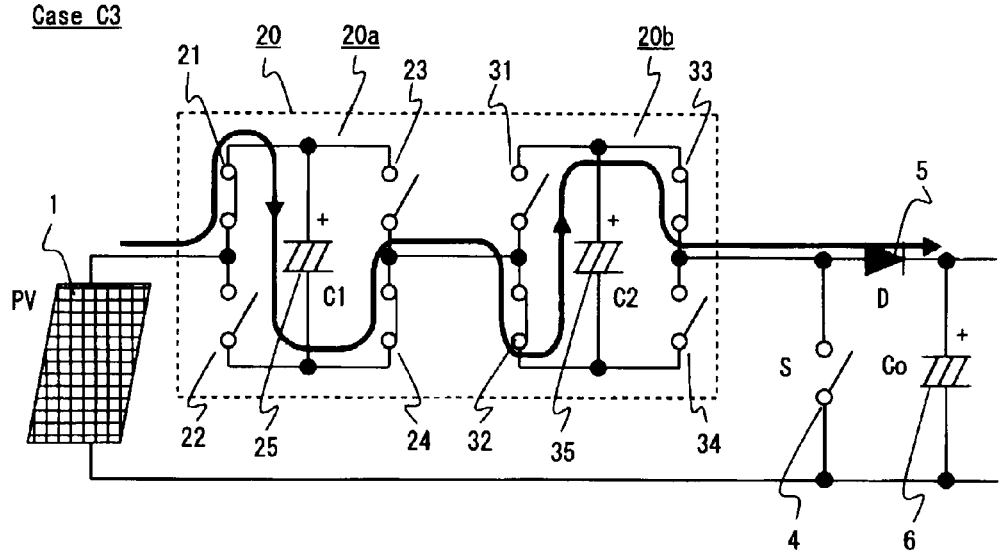
FIG. 9 is a circuit diagram illustrating an operation of the power conversion device according to embodiment 1 of the present invention.
FIG. 10 is a diagram showing a list of operations of the power conversion device according to embodiment 1 of the present invention.

Operations of the power conversion device such configured will be described hereinafter with reference to FIG. 2 to FIG. 9. Here, the operation of boosting the voltage of the smoothing capacitor 6 at the output side of the device to 240 V will be described. FIG. 2 to FIG. 4 illustrate a case where the voltage of the DC power supply 1 is 60 V, FIG. 5 and FIG. 6 illustrate a case where the voltage of the DC power supply 1 is 120 V, and FIG. 7 to FIG. 9 illustrate a case where the voltage of the DC power supply 1 is 180 V. In addition, FIG. 10 shows a list of the above-described operations. It should be noted that: S represents the shorting switch 4; PV represents the DC power supply 1; C1 and C2 represent the first capacitor 25 and the second capacitor 35, respectively; and Co represents the smoothing capacitor 6. The voltage discharged from C1 and C2 is represented by a positive voltage, and the voltage charged into the C1 and C2 is represented by a negative voltage. In addition, the setting voltage set to the first capacitor 25 of the first single-phase inverter 20a is 60 V, whereas the setting voltage set to the second capacitor 35 of the second single-phase inverter 20b is 120 V.

Firstly, an operation in the case where the voltage of the DC power supply 1 is 60 V will be described.

To begin with, as illustrated as Case A1 in FIG. 2, when the semiconductor switch devices 21, 24, 32, and 34 in the inverter circuit 20 are switched ON while the shorting switch 4 is in an ON state, the current from the DC power supply 1 flows along the path described below, and the first capacitor 25 is charged up to 60 V.

DC power supply 1→semiconductor switch device 21→first capacitor 25→semiconductor switch device 24→semiconductor switch device 32→semiconductor switch device 34→shorting switch 4→DC power supply 1

Next, as illustrated as Case A2 in FIG. 3, when the semiconductor switch devices 22, 23, 31, and 34 in the inverter circuit 20 are switched ON while the shorting switch 4 is in an ON state, the current from the DC power supply 1 flows along the path described below, and the second capacitor 35 is charged up to 120 V with the sum of the voltage of the DC power supply 1 and the voltage of the first capacitor 25.

DC power supply 1→semiconductor switch device 22→first capacitor 25→semiconductor switch device 23→semiconductor switch device 31→second capacitor 35→semiconductor switch device 34→shorting switch 4→DC power supply 1

Next, as illustrated as Case A3 in FIG. 4, when the semiconductor switch devices 22, 23, 32, and 33 in the inverter circuit 20 is switched ON while the shorting switch 4 is in an OFF state, the current from the DC power supply 1 flows along the path described below, and the smoothing capacitor 6 is charged with a DC voltage of 240 V, which is the sum of the voltage of the DC power supply 1, the voltage of the first capacitor 25, and the voltage of the second capacitor 35, and then the boost operation completes.

DC power supply 1→semiconductor switch device 22→first capacitor 25→semiconductor switch device 23→semiconductor switch device 32→second capacitor 35→semiconductor switch device 33→rectifier diode 5→smoothing capacitor 6

In this manner, when the voltage of the DC power supply 1 is 60 V, in Cases A1 and A2, DC power is charged in the inverter circuit 20, while the shorting switch 4 is switched ON and the smoothing capacitor 6 is bypassed. In Case A1, the first single-phase inverter 20a is controlled to charge the first capacitor 25, and the second single-phase inverter 20b outputs zero. In Case A2, the second single-phase inverter 20b is controlled to charge the second capacitor 35. In this case, the first single-phase inverter 20a discharges the first capacitor 25, but in the inverter circuit 20 as a whole, DC power is charged. Then, as in Case A1 again, the first capacitor 25 is charged. Accordingly, both the first capacitor 25 and the second capacitor 35 can be charged.

Thereafter, in Case A3, the DC power is discharged from the inverter circuit 20 while the shorting switch 4 is in an OFF state. In this case, when the first single-phase inverter 20a and the second single-phase inverter 20b are controlled to discharge the first capacitor 25 and the second capacitor 35, respectively, the sum of the voltages of the DC power supply 1, and the first and second capacitors 25 and 35 becomes 240 V, and thereby the voltage of the smoothing capacitor 6 is boosted via the rectifier diode 5 up to 240 V. Secondly, an operation in the case where the voltage of the DC power supply 1 is 120 V will be described.

To begin with, as illustrated as Case B1 in FIG. 5, when the semiconductor switch devices 22, 24, 31, and 34 in the inverter circuit 20 are switched ON while the shorting switch 4 is in an ON state, the current from the DC power supply 1 flows along the path described below, and the second capacitor 35 is charged up to 120 V.

DC power supply 1→semiconductor switch device 22→semiconductor switch device 24→semiconductor switch device 31→second capacitor 35→semiconductor switch device 34→shorting switch 4→DC power supply 1

Next, as illustrated as Case B2 in FIG. 6, when the semiconductor switch devices 22, 24, 32, and 33 in the inverter circuit 20 are switched ON while the shorting switch 4 is in an OFF state, the current from the DC power supply 1 flows along the path described below, and the smoothing capacitor 6 is charged with a DC voltage of 240 V, which is the sum of the voltage of the DC power supply 1 and the voltage of the second capacitor 35, and then the boost operation completes.

DC power supply 1→semiconductor switch device 22→semiconductor switch device 24→semiconductor switch device 32→second capacitor 35→semiconductor switch device 33→rectifier diode 5→smoothing capacitor 6

In this manner, when the voltage of the DC power supply 1 is 120 V, in Case B1, DC power is charged in the inverter circuit 20, while the shorting switch 4 is switched ON and the smoothing capacitor 6 is bypassed. In Case B1, the second single-phase inverter 20b is controlled to charge the second capacitor 35, and the first single-phase inverter 20a outputs zero. In Case B2, the DC power is discharged from the inverter circuit 20 while the shorting switch 4 is in an OFF state. In this case, when the second single-phase inverter 20b is controlled to discharge the second capacitor 35, the sum of the voltages of the DC power supply 1 and the second capacitor 35 becomes 240 V, and thereby the voltage of the smoothing capacitor 6 is boosted via the rectifier diode 5 up to 240 V.

Thirdly, an operation in the case the voltage of the DC power supply 1 is 180 V will be described.

To begin with, as illustrated as Case C1 in FIG. 7, when the semiconductor switch devices 21, 24, 31, and 34 in the inverter circuit 20 are switched ON while the shorting switch 4 is in an ON state, the current from the DC power supply 1 flows along the path described below, and the first capacitor 25 is charged up to 60 V, and the second capacitor 35 is charged up to 120 V.

DC power supply 1→semiconductor switch device 21→first capacitor 25→semiconductor switch device 24→semiconductor switch device 31→second capacitor 35→semiconductor switch device 34→shorting switch 4→DC power supply 1

Next, as illustrated as Case C2 in FIG. 8, when the semiconductor switch devices 22, 23, 32, and 34 in the inverter circuit 20 are switched ON while the shorting switch 4 in an OFF state, the current from the DC power supply 1 flows along the path described below, and the smoothing capacitor 6 is charged with a DC voltage of 240 V, which is the sum of the voltage of the DC power supply 1 and the voltage of the first capacitor 25, and then the boost operation completes.

DC power supply 1→semiconductor switch device 22→first capacitor 25→semiconductor switch device 23→semiconductor switch device 32→semiconductor switch device 34→rectifier diode 5→smoothing capacitor 6

Further, Case C3 in FIG. 9 may be used in place of above-described Case C2. That is, when the semiconductor switch devices 21, 24, 32, and 33 in the inverter circuit 20 are switched ON while the shorting switch 4 is in an OFF state, the current from the DC power supply 1 flows along the path described below, and the smoothing capacitor 6 is charged with a DC voltage of 240 V, which is the voltage obtained by subtracting the voltage of the first capacitor 25 from the sum of the voltage of the DC power supply 1 and the voltage of the second capacitor 35, and then the boost operation completes.

DC power supply 1→semiconductor switch device 21→first capacitor 25→semiconductor switch device 24→semiconductor switch device 32→second capacitor 35→semiconductor switch device 33→rectifier diode 5→smoothing capacitor 6

In this manner, when the voltage of the DC power supply 1 is 180 V, in Case C1, DC power is charged in the inverter circuit 20 while the shorting switch 4 is switched ON and the smoothing capacitor 6 is bypassed. In this case, the first single-phase inverter 20a and the second single-phase inverter 20b are controlled to charge the first capacitor 25 and the second capacitor 35, respectively. Then, in Cases C2 and C3, the DC power is discharged from the inverter circuit 20 while the shorting switch 4 is in an OFF state. In Case C2, the first single-phase inverter 20a is controlled to discharge the first capacitor 25, and the second single-phase inverter 20b outputs zero. In Case C3, the second single-phase inverter 20b is controlled to discharge the second capacitor 35. In this case, the first single-phase inverter 20a charges the first capacitor 25, but in the inverter circuit 20 as a whole, the DC power is discharged.

In this embodiment, DC/DC conversion is performed by utilizing charge/discharge of DC power in the inverter circuit 20 as described above, and thus no large-capacity reactor is required. In addition, in accordance with the voltage of the DC power supply 1, output of the inverter circuit 20 is controlled thereby to superimpose the output voltages of the first single-phase inverter 20a and the second single-phase inverter 20b onto the voltage of the DC power supply 1, and to output a desired voltage to the smoothing capacitor 6.

In addition, upon ON/OFF switching of the shorting switch 4, the inverter circuit 20 is controlled to switch an operation of charge/discharge of DC voltage. That is, when the shorting switch 4 is in an ON state, the DC voltage of the inverter circuit 20 can be charged while the smoothing capacitor 6 is bypassed, and the charged energy can be discharged to the smoothing capacitor 6 when the shorting switch 4 is in an OFF state. Accordingly, the shorting switch 4 and the semiconductor switch devices in the inverter circuit 20 need not perform high frequency switching, and the voltage used for switching in the inverter circuit 20 can be set lower than the setting voltage of the smoothing capacitor 6. In this manner, with the use of low frequency switching while lowering the voltages of the capacitors 25 and 35 than the setting voltage of the smoothing capacitor 6, it is possible to realize a power conversion device that facilitates reduction in power loss and noise, and also facilitates downsizing and weight saving of the device.

Figure 11:
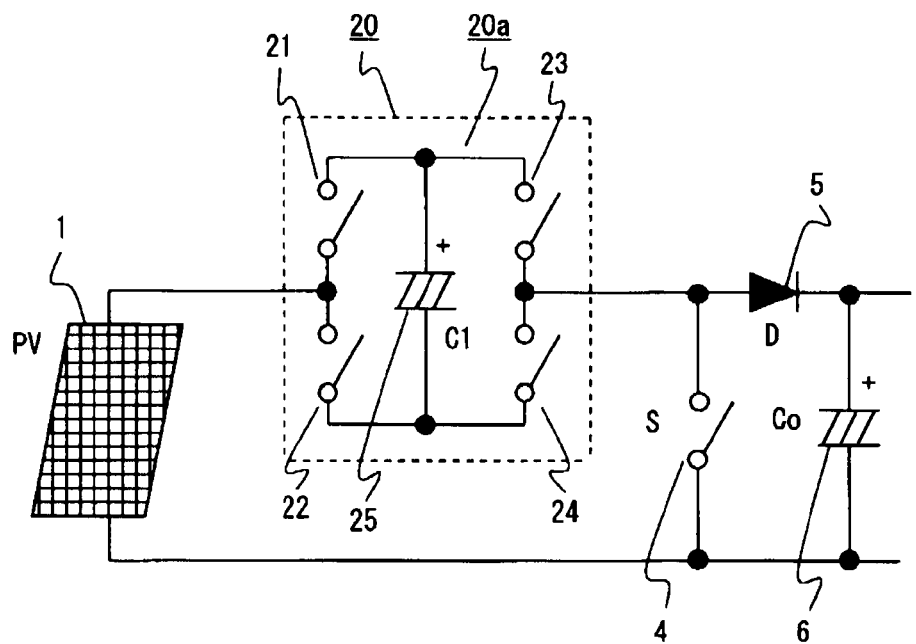
FIG. 11 is a configuration diagram of a main circuit of a power conversion device according to a modified example of embodiment 1 of the present invention.
Figure 12:
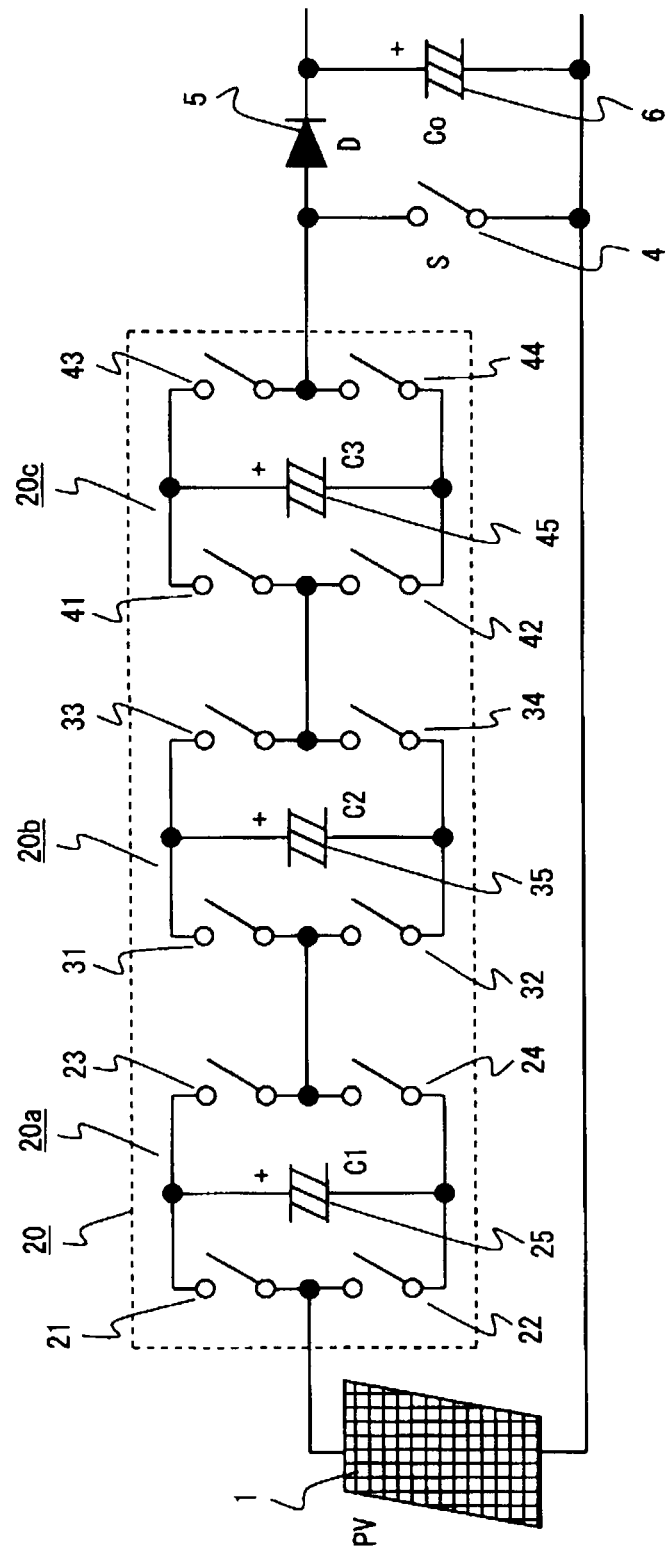
FIG. 12 is a configuration diagram of a main circuit of a power conversion device according to a modified example of embodiment 1 of the present invention.

In addition, in the above-described embodiment, the inverter circuit 20 is configured with two single-phase inverters 20a and 20b. However, as illustrated in FIG. 11, the inverter circuit 20 may be configured with only one single-phase inverter 20a. Alternatively, as illustrated in FIG. 12, the inverter circuit 20 may be configured with three or more single-phase inverters 20a to 20c with their AC sides connected in series to one another. In FIG. 12, 20c represents a third single-phase inverter, which includes semiconductor switch devices 41 to 44 and a third capacitor 45 which functions as a DC voltage source. In this manner, regardless of the number of the single-phase inverters in the inverter circuit 20, effects similar to those described above can be obtained. When a plurality of single-phase inverters are used, the output voltage of the inverter circuit 20 is shared by them. That is, the voltage used by each single-phase inverter for switching can be reduced, and switching loss can be further reduced.

Figure 13:
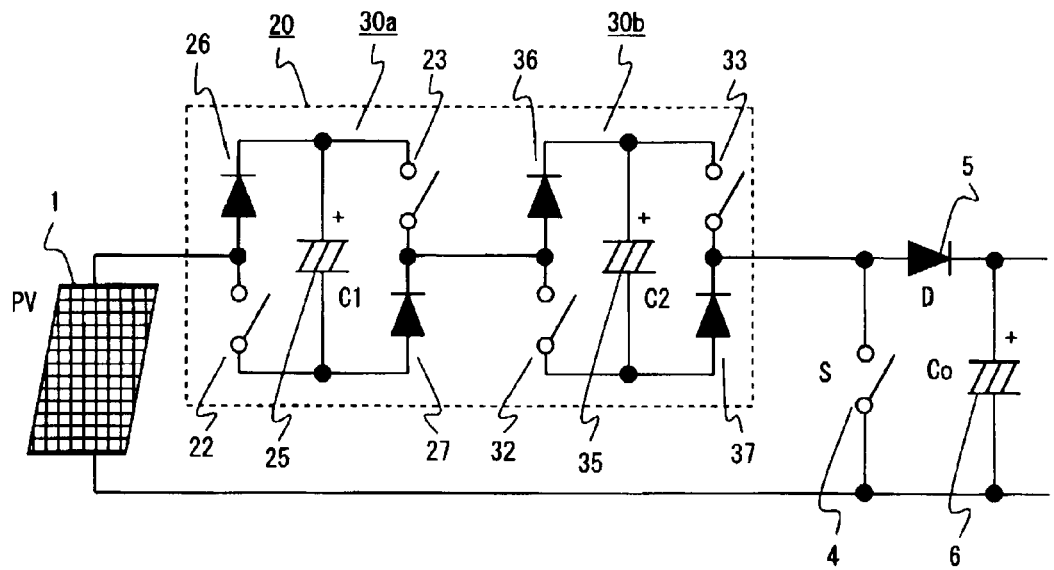
FIG. 13 is a configuration diagram of a main circuit of a power conversion device according to a modified example of embodiment 1 of the present invention.

In addition, the first single-phase inverter and the second single-phase inverter included in the inverter circuit 20 may be a first single-phase inverter 30a and a second single-phase inverter 30b, respectively, as illustrated in FIG. 13, which are configured with full-bridge inverters, respectively composed of: the semiconductor switches 22 and 23, diodes 26 and 27, and the first capacitor 25; and the semiconductor switches 32 and 33, diodes 36 and 37, and the second capacitor 35. With this configuration, similar effects can be obtained.

In addition, in the above-described embodiment, the cathode side of the rectifier diode 5 is connected to the positive terminal of the smoothing capacitor 6 in the output stage. However, the rectifier diode 5 may be arranged on the negative terminal side of the smoothing capacitor 6 such that the negative terminal of the smoothing capacitor 6 is connected to the anode side of the rectifier diode 5, and an operation similar to that in the above-described embodiment can be achieved.

Figure 14:
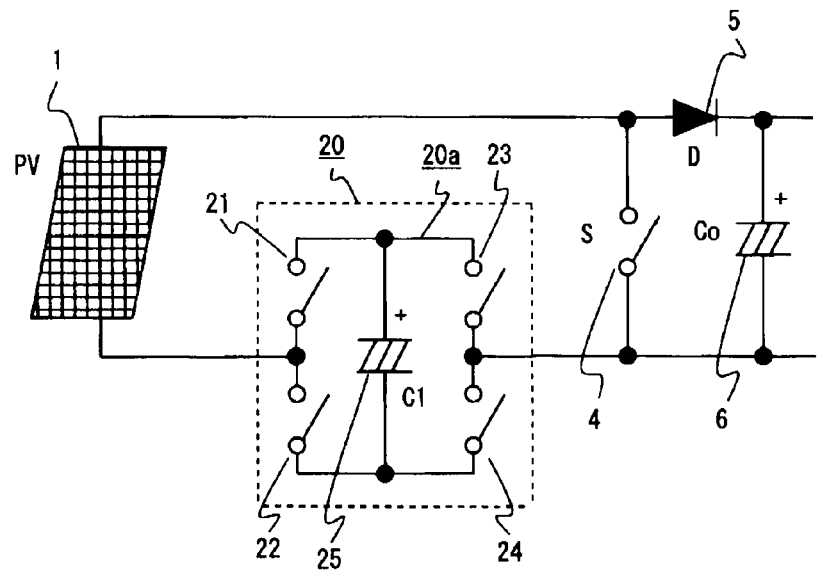
FIG. 14 is a configuration diagram of a main circuit of a power conversion device according to a modified example of embodiment 1 of the present invention.
Figure 15:
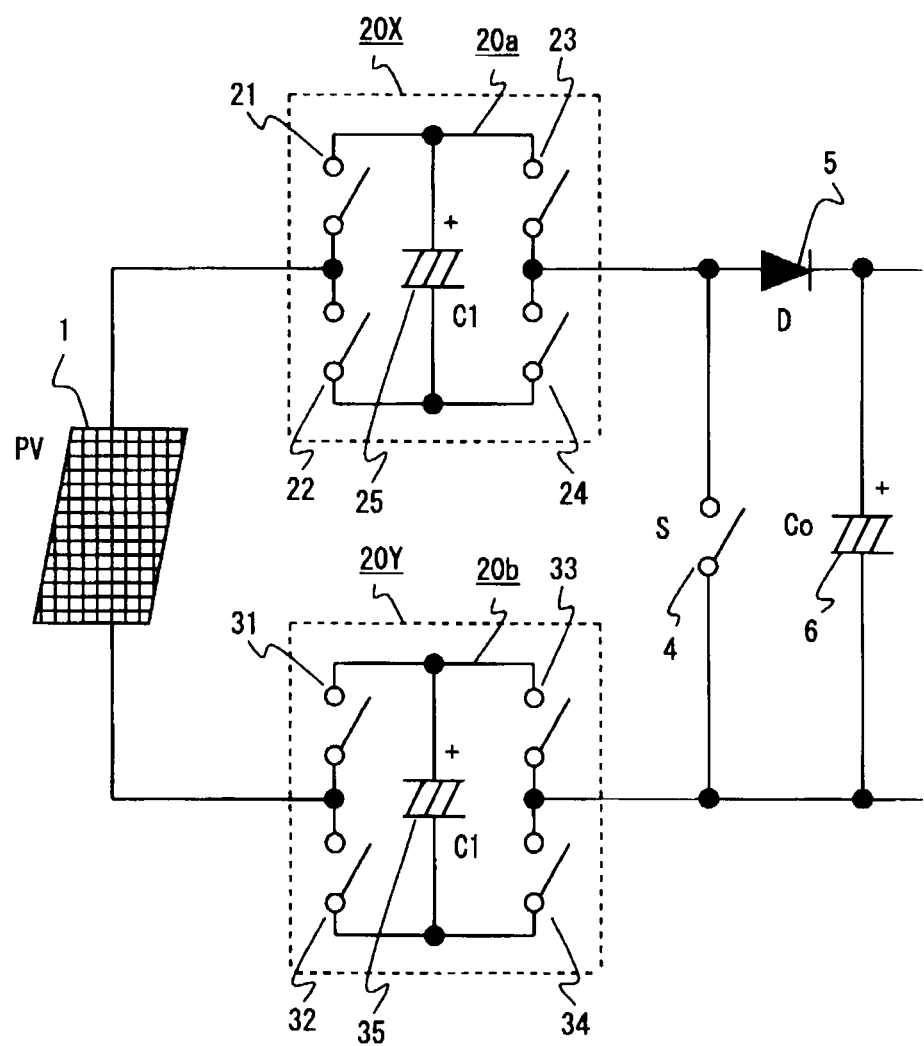
FIG. 15 is a configuration diagram of a main circuit of a power conversion device according to a modified example of embodiment 1 of the present invention.

In addition, in the above-described embodiment, the inverter circuit 20 is connected to the positive terminal of the smoothing capacitor 6 in the output stage. However, as illustrated in FIG. 14, the inverter circuit 20 may be arranged to be connected to the negative terminal of the smoothing capacitor 6. Further, as illustrated in FIG. 15, two inverter circuits 20X and 20Y may be arranged such that the inverter circuit 20X is connected to the positive terminal side of the smoothing capacitor 6 in the output stage, and the inverter circuit 20Y is connected to the negative terminal side of the smoothing capacitor 6 in the output stage. In the case of application of a special power supply such as a solar battery including a stray capacitance, the two inverter circuits, which are respectively arranged on the positive terminal side and the negative terminal side of the special power supply in a manner as to sandwich the special power supply, perform a common operation, and thereby it is possible to achieve the effect that no variation occurs in the potential at a certain point.

Figure 16:
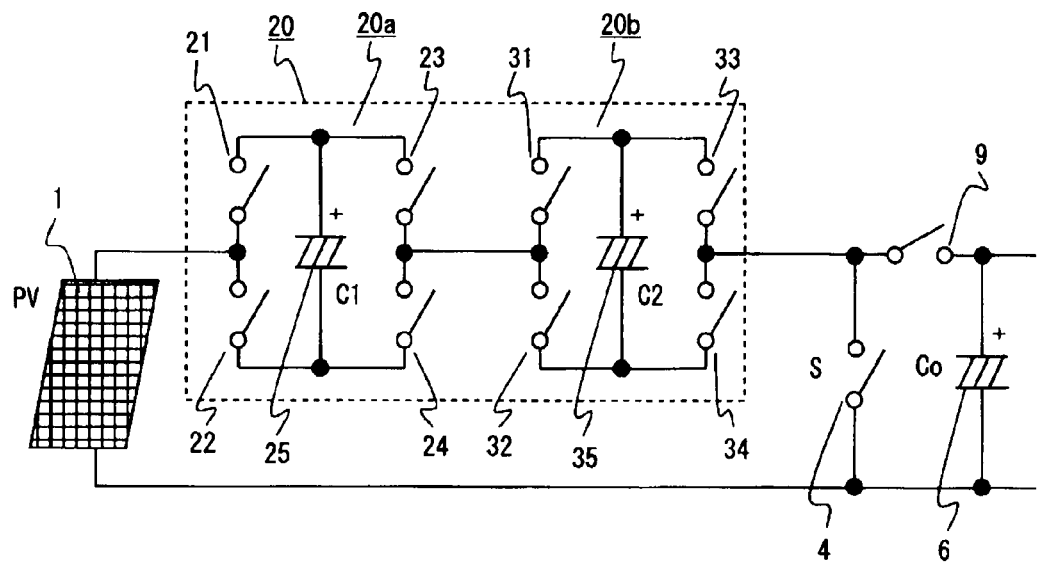
FIG. 16 is a configuration diagram of a main circuit of a power conversion device according to a modified example of embodiment 1 of the present invention.

In addition, as illustrated in FIG. 16, a switch 9 may be used in place of the rectifier diode 5, as an element for switching between conduction and non-conduction. The switch 9 is controlled such that its ON/OFF state is reverse to that of the shorting switch 4. That is, when the shorting switch 4 is in an ON state, the switch 9 is in an OFF state, and the DC voltage of the inverter circuit 20 is charged while the smoothing capacitor 6 is bypassed. Then, when the shorting switch 4 is in an OFF state, the charged energy is used to be discharged to the smoothing capacitor 6 by switching the switch 9ON. Here, the switch 9 may be a semiconductor switch device such as an IGBT and MOSFET, or a mechanical switch or the like.

Embodiment 2

Figure 17:
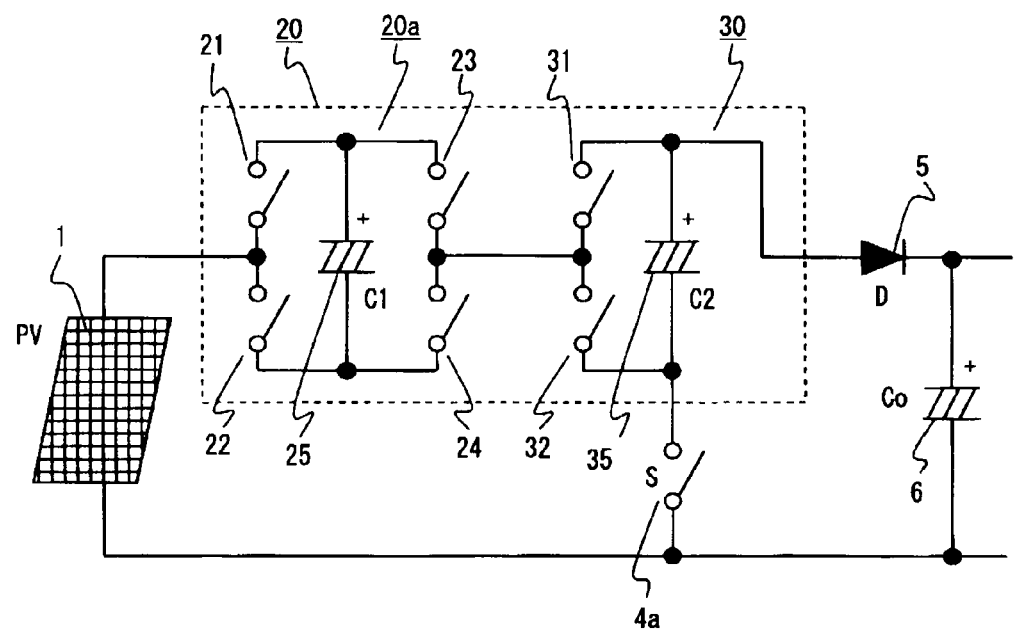
FIG. 17 is a configuration diagram of a main circuit of a power conversion device according to embodiment 2 of the present invention.

In above-described embodiment 1, one end of the shorting switch 4 is connected to the AC output line subsequent to the inverter circuit 20. Meanwhile, in embodiment 2, as illustrated in FIG. 17, one end of a shorting switch 4a is connected to the negative terminal of a second capacitor 35 of a half-bridge single-phase inverter 30, which is a single-phase inverter (in this case, a second single-phase inverter) included as the last stage in the inverter circuit 20. The other end of the shorting switch 4a is connected to the negative terminal of a smoothing capacitor 6, similarly to embodiment 1. In addition, the anode of a rectifier diode 5 is connected to the positive terminal of the second capacitor 35, and the cathode thereof is connected to the positive terminal of the smoothing capacitor 6.

In this embodiment, the inverter circuit 20 and the shorting switch 4a are controlled in the same manner as in embodiment 1. And regardless of whether the shorting switch 4a is switched ON or OFF, the number of elements through which current passes can be reduced, the conduction loss can be reduced, and the conversion efficiency of the whole power conversion device can be improved. In addition, the single-phase inverter in the last stage is configured with a half-bridge single-phase inverter 30, which enhances simplification of the circuit configuration.

Figure 18:
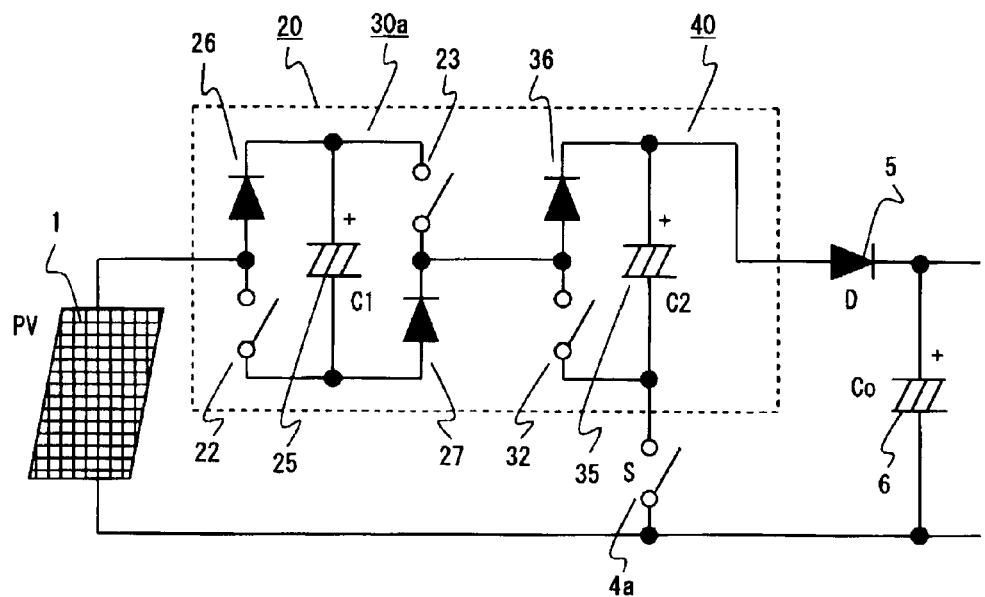
FIG. 18 is a configuration diagram of a main circuit of a power conversion device according to a modified example of embodiment 2 of the present invention.

It should be noted that, as illustrated in FIG. 18, the single-phase inverter in the last stage may be configured with a half-bridge single-phase inverter 40 that is formed of the semiconductor switch 32, the diode 36, and the second capacitor 35, and similar effects can be obtained with this configuration. In this case, the first single-phase inverter 30a is configured with a full-bridge inverter that includes the semiconductor switches 22 and 23, the diodes 26 and 27, and the first capacitor 25.

Figure 19:
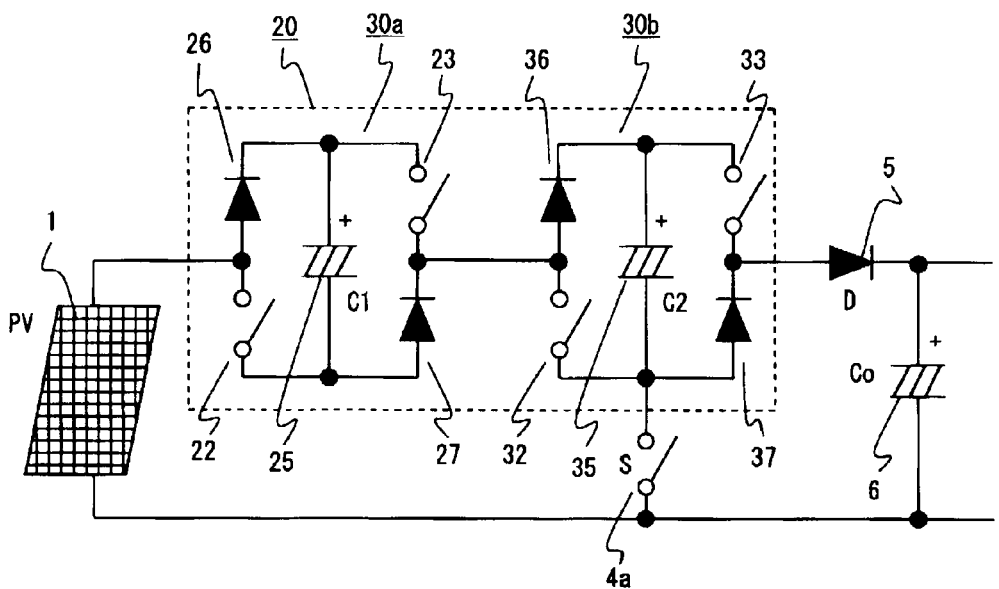
FIG. 19 is a configuration diagram of a main circuit of a power conversion device according to a modified example of embodiment 2 of the present invention.

It should be noted that, in this embodiment, the single-phase inverter in the last stage is configured with the half-bridge single-phase inverter 30 or 40, but may be configured with a full-bridge single-phase inverter 30b, as illustrated in FIG. 19. In this case, by connecting one end of the shorting switch 4a to the negative terminal of the second capacitor 35, it is possible to achieve the effects of reduction in the number of elements through which current passes, and reduction in conduction loss, when the shorting switch 4a is in an ON state.

Embodiment 3

Next, a power conversion device according to embodiment 3 of the present invention will be described with reference to FIG. 20. It should be noted that the main circuit of the power conversion device has the same configuration as that illustrated in FIG. 1 of embodiment 1.

Figure 20:
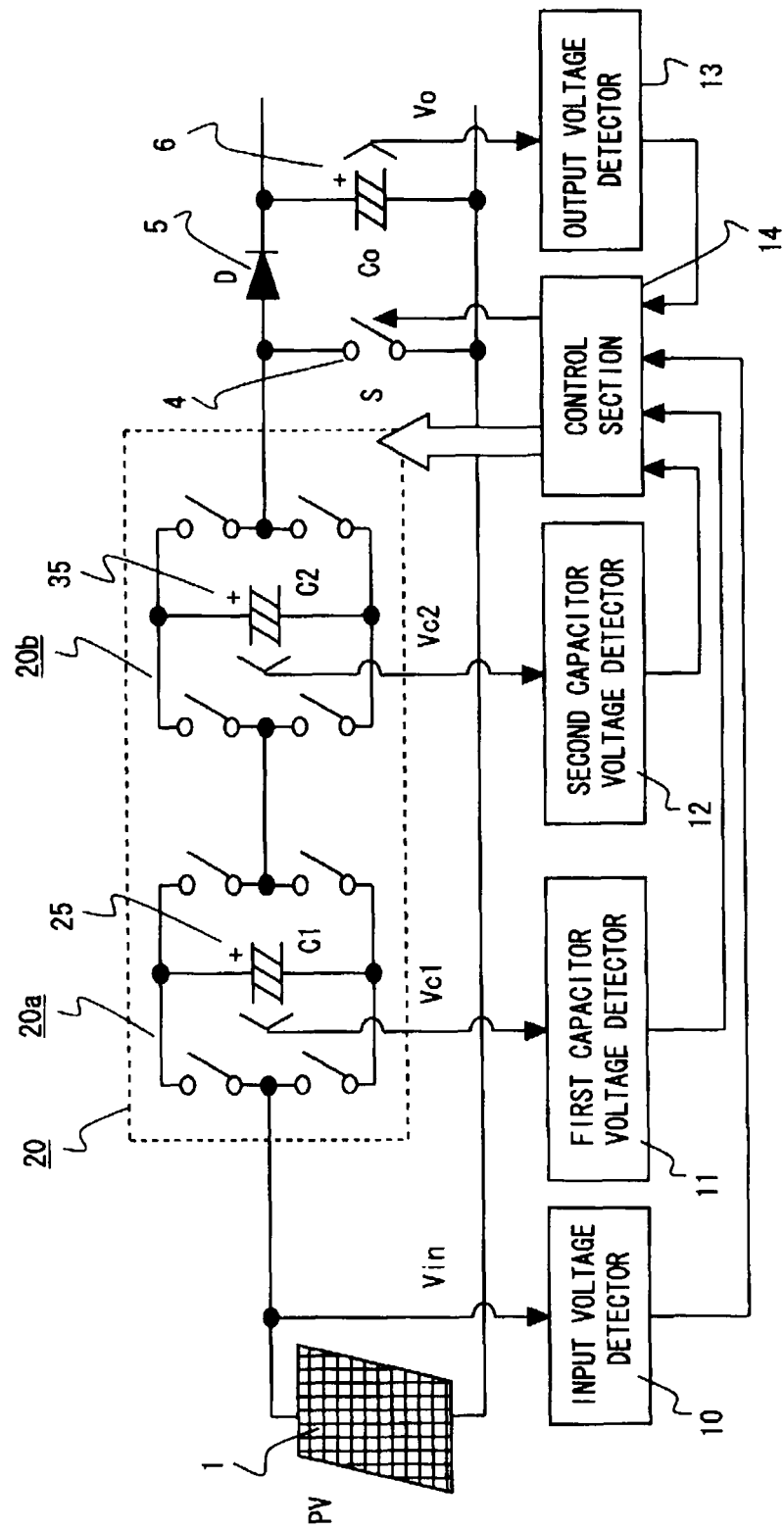
FIG. 20 is a configuration diagram of a power conversion device according to embodiment 3 of the present invention.

As illustrated in FIG. 20, the power conversion device includes: an input voltage detector 10 detecting a voltage Vin from the DC power supply 1, a first capacitor voltage detector 11 and a second capacitor voltage detector 12 which respectively detect voltages of the first capacitor 25 and the second capacitor 35 in the inverter circuit 20, an output voltage detector 13 detecting a voltage Vo of the smoothing capacitor 6 at the output side of the device, and a control section 14. The control section 14 receives output signals from the voltage detectors 10 to 13 as inputs, and controls the switching devices in the inverter circuit 20 and the shorting switch 4. Here, the control section 14 is configured with, for example, a microcomputer, a digital signal processor, or the like.

Figure 21:
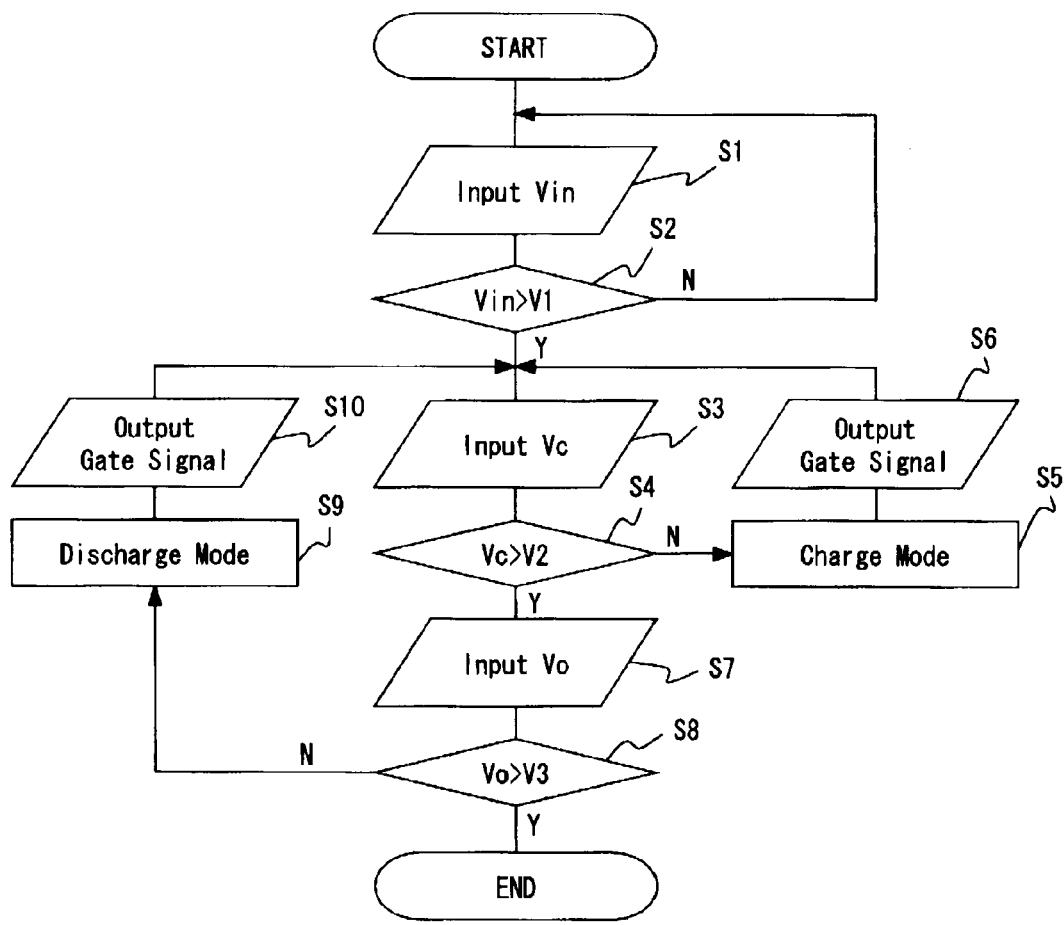
FIG. 21 is a flowchart showing an operation of a control section according to embodiment 3 of the present invention.

An operation of the control section 14 will be described hereinafter with reference to a flowchart shown in FIG. 21.

The control section 14 monitors an input voltage Vin obtained from the DC power supply 1 (S1) to determine whether the input voltage Vin exceeds a predetermined input voltage setting value V1 (S2). When the input voltage Vin exceeds the voltage V1, the control section 14 activates the main circuit.

Next, the control section 14 monitors a capacitor voltage Vc in the inverter circuit 20 (S3) to determine whether the capacitor voltage Vc exceeds a capacitor voltage setting value V2 (S4). Here, the capacitor voltage Vc represents the voltage Vc1 of the first capacitor 25 and the voltage Vc2 of the second capacitor 35, and in addition, the capacitor voltage setting value V2 represents two voltage values V21 and V22 which are set for the first capacitor 25 and the second capacitor 35, respectively.

The control section 14 compares the voltage Vc1 of the first capacitor 25 and the voltage Vc2 of the second capacitor 35 with the respective voltage setting values V21 and V22, and determines that it is in a charge mode until both voltages Vc1 and Vc2 exceed the respective voltage setting values V21 and V22 (S5), and outputs a driving signal for switching the shorting switch 40N, and in addition, outputs a driving signal to each switching device in the inverter circuit 20 in accordance with the input voltage Vin from the DC power supply 1 thereby to charge DC power in the inverter circuit 20 (S6).

In step S4, as a result of comparison of the voltage Vc1 of the first capacitor 25 and the voltage Vc2 of the second capacitor 35 with the respective voltage setting values V21 and V22, when both voltages Vc1 and Vc2 exceed the respective voltage setting values V21 and V22, that is, when charge of the first capacitor 25 and the second capacitor 35 has completed, the control section 14 monitors the voltage Vo of the smoothing capacitor 6 (S7) at the output side of the power conversion device. Then, the control section 14 determines whether the voltage Vo of the smoothing capacitor exceeds an output voltage setting value V3, which is a target voltage value (S8). When the smoothing capacitor voltage Vo is lower than or equal to the output voltage setting value V3, the control section 14 determines that it is to be in a discharge mode (S9), and outputs a driving signal for switching the shorting switch 4 OFF, and in addition, outputs a driving signal to each switching device in the inverter circuit 20 in accordance with the input voltage Vin from the DC power supply 1 thereby to discharge the DC power in the inverter circuit 20 (S10) and also to charge the smoothing capacitor 6 until the voltage Vo reaches the output voltage setting value V3.

In this embodiment, the capacitors 25 and 35 in the inverter circuit 20 are controlled to be discharged upon completion of their complete charging. Thus, even if the DC power supply 1 has a large voltage variation like a solar battery, it is possible to easily and certainly control the voltage of the smoothing capacitor 6.

It should be noted that, in this embodiment, the main circuit configuration described with reference to FIG. 1 of embodiment 1 is employed. However, similar control and effects can be achieved even with the use of any of the various main circuit configurations in embodiments 1 and 2.

Embodiment 4

In above-described embodiment 3, upon completion of charging the capacitors 25 and 35 in the inverter circuit 20, the shorting switch 4 is switched from ON to OFF, and thereby charge/discharge of the DC power in the inverter circuit 20 is switched. However, in this embodiment, the charge/discharge is switched based on the timing described below.

If the voltage Vin from the DC power supply 1 and the output voltage (total sum of the output voltage of the single-phase inverter 20a and the output voltage of the single-phase inverter 20b) of the inverter circuit 20 are opposite in polarity and are substantially equal in magnitude to each other, the shorting switch 4 is switched from ON to OFF, and thereby charge/discharge of DC power in the inverter circuit 20 is switched.

That is, when the charge voltage of the inverter circuit 20 during its charging as a whole is substantially equal to the voltage Vin from the DC power supply 1, and the voltage obtained by superimposing, onto the voltage Vin, the total sum of the output voltages of the single-phase inverters 20a and 20b, which is the output voltage of the inverter circuit 20, is approximately zero, the shorting switch 4 is switched from ON to OFF. Since current hardly flows at this switching, null-current switching can be realized, and it is possible to reduce switching loss and noise. Therefore, highly efficient and reliable control can be realized.

Embodiment 5

Figure 22:
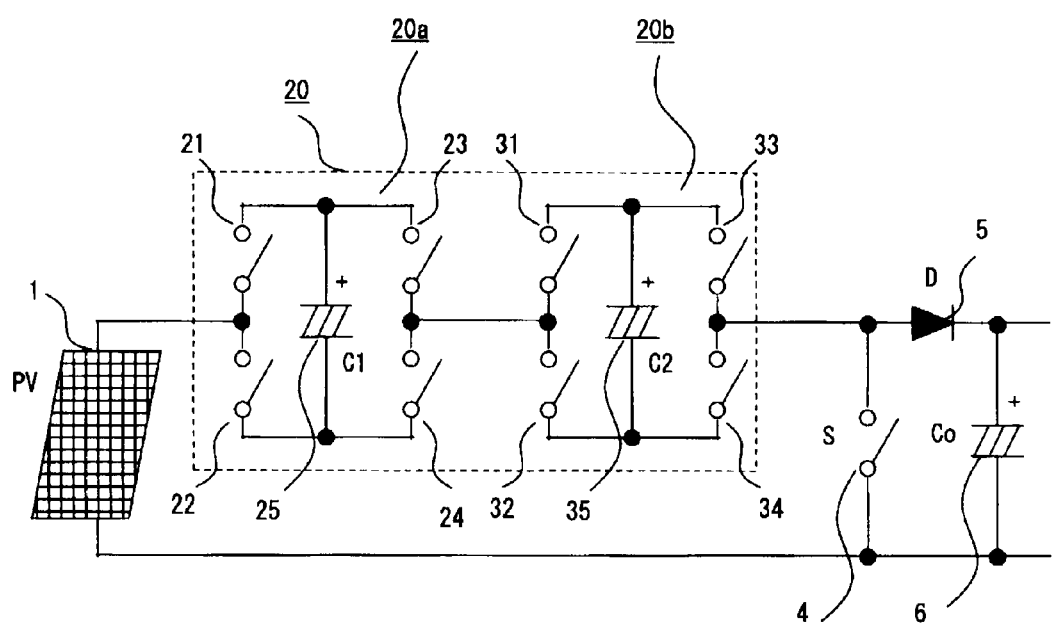
FIG. 22 is a configuration diagram of a main circuit of a power conversion device according to embodiment 5 of the present invention.

Next, a power conversion device according to embodiment 5 of the present invention will be described. FIG. 22 is a configuration diagram of a main circuit of the power conversion device according to embodiment 5 of the present invention. It should be noted that, since the main circuit configuration is similar to the main circuit configuration according to embodiment 1, explanation thereof will be omitted.

Figure 23:
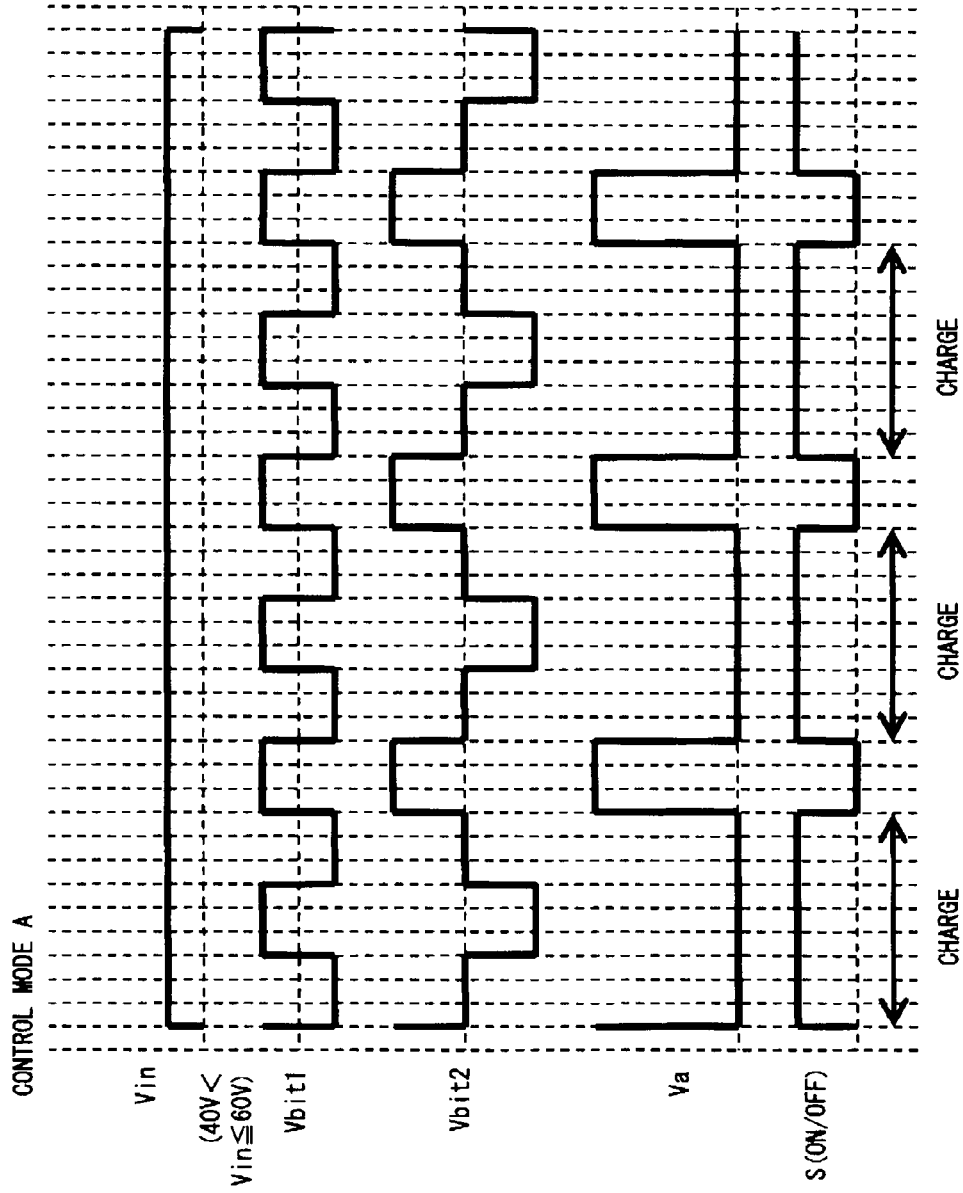
FIG. 23 is a waveform chart illustrating an operation of the power conversion device in a control mode A according to embodiment 5 of the present invention.
Figure 24:
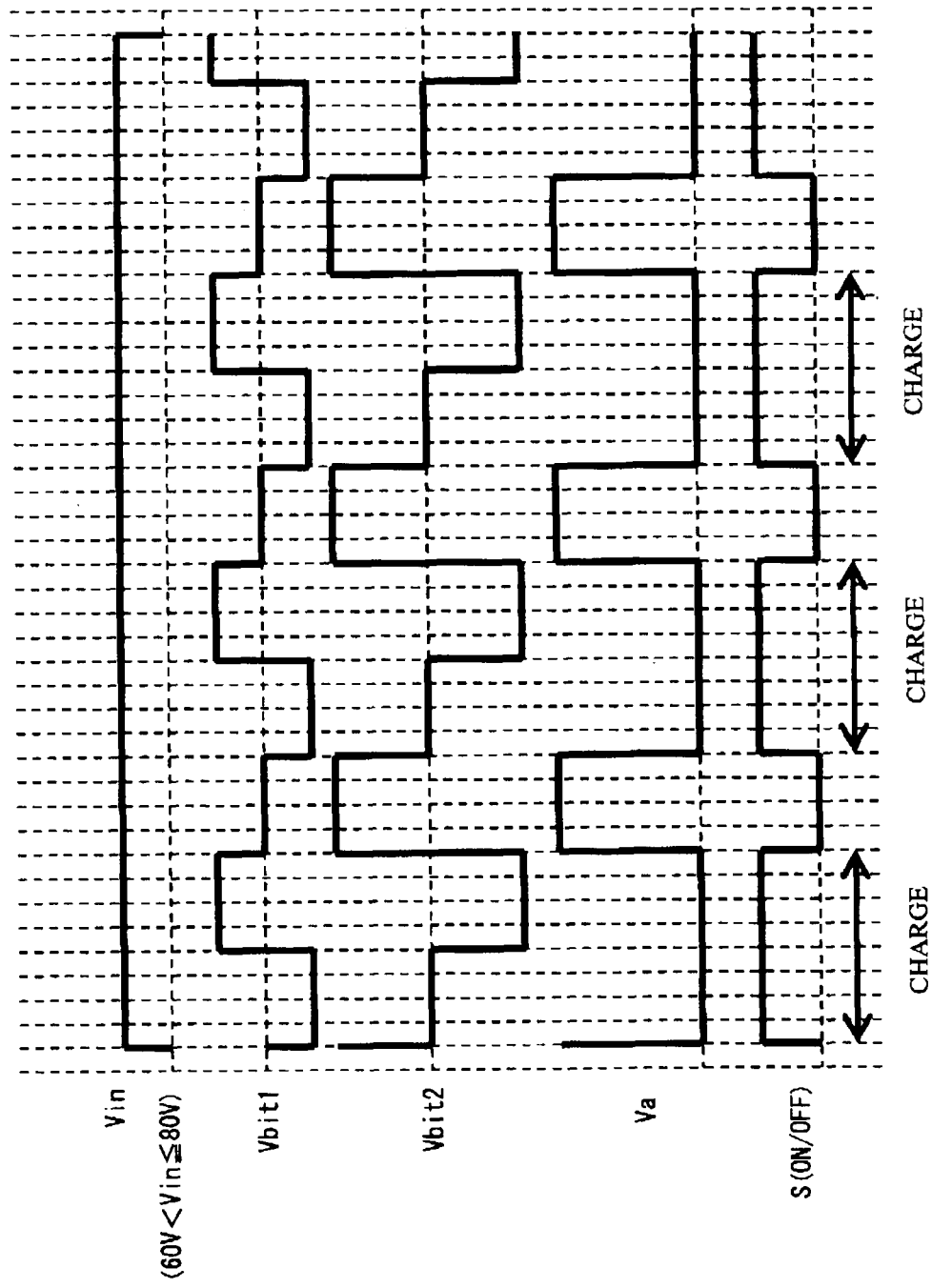
FIG. 24 is a waveform chart illustrating an operation of the power conversion device in a control mode B according to embodiment 5 of the present invention.
Figure 25:
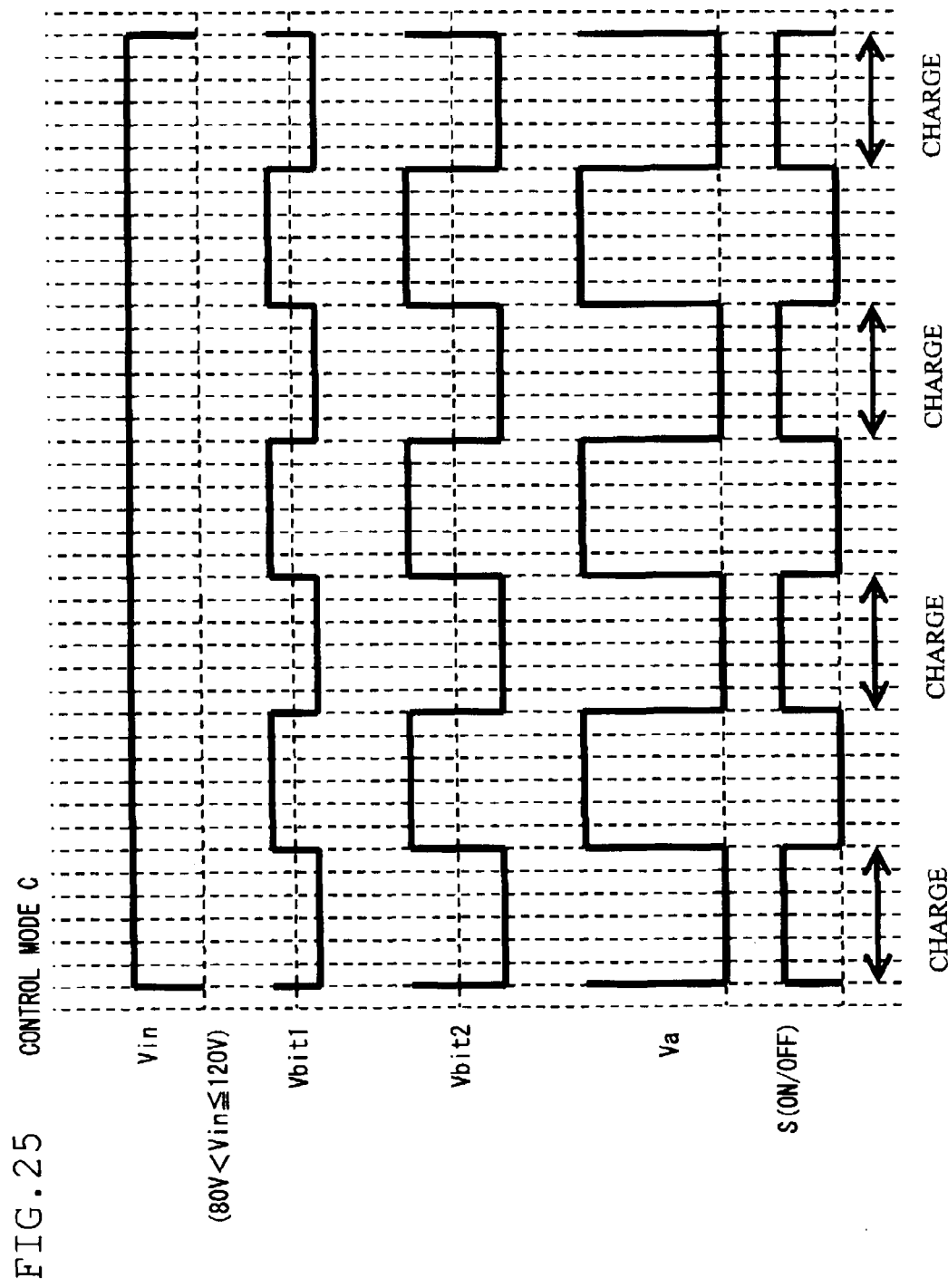
FIG. 25 is a waveform chart illustrating an operation of the power conversion device in a control mode C according to embodiment 5 of the present invention.
Figure 26:
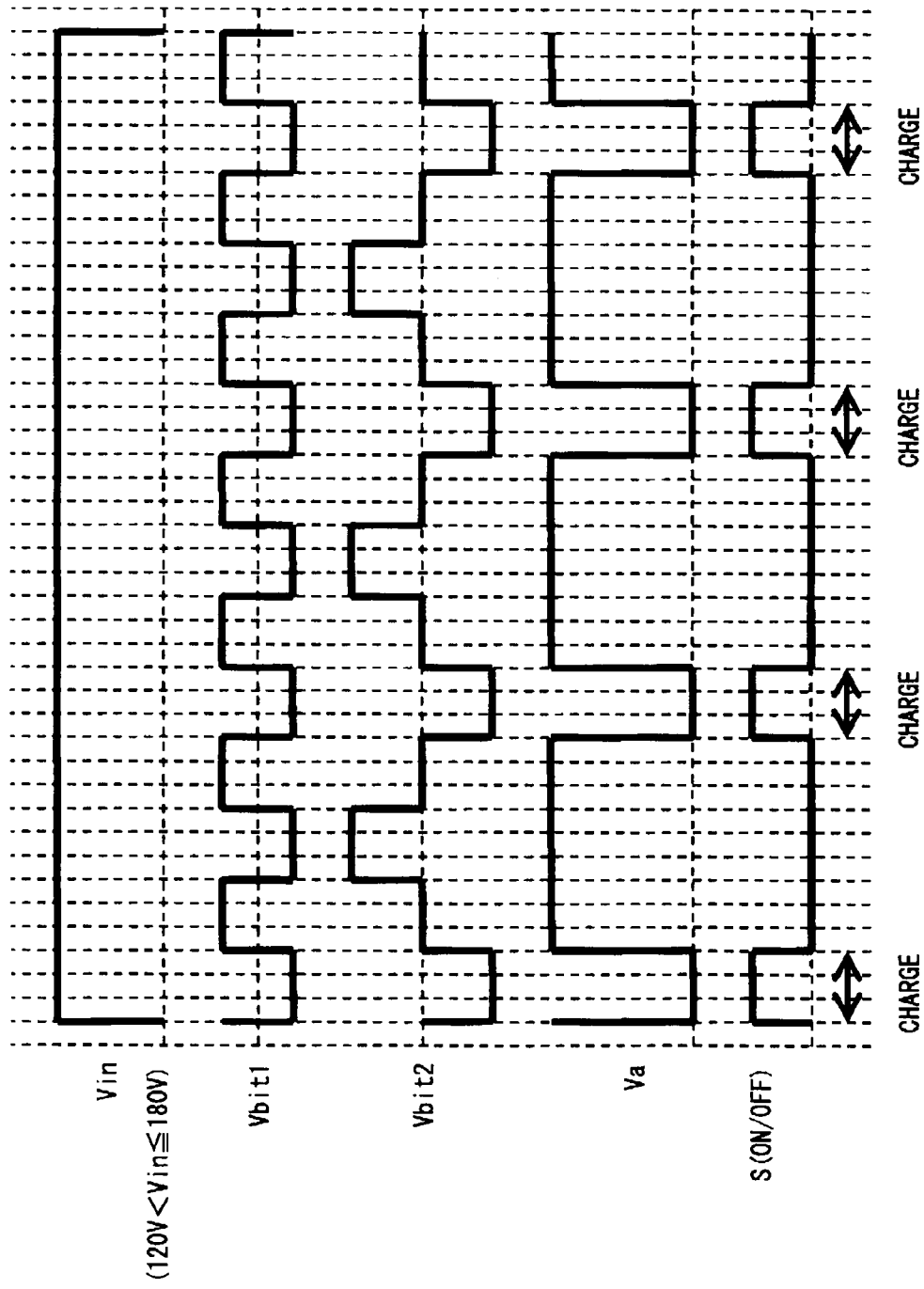
FIG. 26 is a waveform chart illustrating an operation of the power conversion device in a control mode D according to embodiment 5 of the present invention.

Operations of the power conversion device such configured will be described hereinafter with reference to FIG. 23 to FIG. 27. Here, operations of boosting the voltage V0 of the smoothing capacitor 6 at the output side of the device in a range of 160 V<Vo≤240 V will be described. FIG. 23 shows a case where the voltage Vin of the DC power supply 1 is 40 V<Vin≤60 V, FIG. 24 shows a case where the voltage Vin of the DC power supply 1 is 60 V<Vin≤80 V, FIG. 25 shows a case where the voltage Vin of the DC power supply 1 is 80 V<vin≤120 v, and FIG. 26 shows a case where the voltage Vin of the DC power supply 1 is 120 V<Vin≤180 V. In addition, FIG. 27 shows a list of the above operations. It should be noted that, for convenience, FIG. 27 shows cases where the voltage Vin are 50 V, 60 V, 70 V, 80 V, 90 V, 105 V, 120 V, 135 V, 150 V, 165 V, and 180 V.

In FIG. 23 to FIG. 26, Vbit1 represents an output voltage of the first single-phase inverter 20a; Vbit2 represents an output voltage of the second single-phase inverter 20b; and Va represents a voltage obtained by superimposing, onto the voltage Vin of the DC power supply 1, the output voltages Vbit1 and Vbit2 of the first and second single-phase inverters 20a and 20b, that is, Vin+Vbit1+Vbit2. In addition, S (ON/OFF) represents a signal indicating an ON/OFF state of the shorting switch 4.

Here, the ratio of the setting voltage Vc1 of the first capacitor 25 in the first single-phase inverter 20a to the setting voltage Vc2 of the second capacitor 35 in the second single-phase inverter 20b is set (Vc1:Vc2)=(1:2).

For the power conversion device, a plurality of control modes are set in advance, which are based on the combinations of output control of the first and second single-phase inverters 20a and 20b, and ON/OFF control of the shorting switch 4. In accordance with the voltage Vin of the DC power supply 1, one of the control modes is selected and switching thereto is performed. In this case, control modes A to D are to be used. In each control mode, charge/discharge of the DC power in the inverter circuit 20, based on a predetermined control operation of the power conversion device, is repeated in a constant cycle. As will be described later, the cycle includes a plurality of control operation periods (hereinafter referred to as intervals) in which different control operations are performed.

In the case of 40 V<Vin≤60 V shown in FIG. 23, the power conversion device operates in control mode A. In this control mode A, one cycle of the operation of charging/discharging the DC power in the inverter circuit 20 is divided into four intervals, i.e., first to fourth intervals. In the first to third intervals, the shorting switch 4 is switched ON, the smoothing capacitor 6 is bypassed, and the DC power of the inverter circuit 20 is charged. In the fourth interval, the shorting switch 4 is switched OFF, the DC power of the inverter circuit 20 is discharged, and the smoothing capacitor 6 is charged via the rectifier diode 5 with the sum of voltages obtained by superimposing the voltage of the discharged DC power onto the voltage of the DC power supply 1. The voltage Vo of the smoothing capacitor 6 is an output voltage, and the boost ratio in this control mode A is 4.

For example, when the voltage Vin of the DC power supply 1 is 60 V, in the first interval, the first capacitor 25 is charged up to 60 v, and in the second interval, the second capacitor 35 is charged up to 120 V with the sum of the voltage Vin of the DC power supply 1 and the voltage of the first capacitor 25. In the third interval, the first capacitor 25 is charged up to 60 V again. Then, in the fourth interval, the shorting switch 4 is switched OFF, and the smoothing capacitor 6 is charged, via the rectifier diode 5, with a DC voltage of 240 V, which is the sum of the voltage Vin of the DC power supply 1, the voltage of the first capacitor 25, and the voltage of the second capacitor 35.

In the case of 60 V<Vin≤80 V shown in FIG. 24, the power conversion device operates in control mode B. In this control mode B, one cycle of the operation of charging/discharging the DC power in the inverter circuit 20 is divided into three intervals, i.e., first to third intervals. In the first and second intervals, the shorting switch 4 is switched ON, the smoothing capacitor 6 is bypassed, and the DC power of the inverter circuit 20 is charged. In the third interval, the shorting switch 4 is switched OFF, the DC power of the inverter circuit 20 is discharged, and the smoothing capacitor 6 is charged via the rectifier diode 5 with the sum of the voltages obtained by superimposing the voltage of the discharged DC power onto the voltage of the DC power supply 1. The boost ratio in this control mode B is 3.

For example, when the voltage vin of the DC power supply 1 is 80 V, in the first interval, the first capacitor 25 is charged up to 80 V, and in the second interval, the second capacitor 35 is charged up to 160 V with the sum of the voltage Vin of the DC power supply 1 and the voltage of the first capacitor 25. Then, in the third interval, the shorting switch 4 is switched OFF, and the smoothing capacitor 6 is charged, via the rectifier diode 5, with a DC voltage of 240 V, which is the sum of the voltage Vin of the DC power supply 1 and the voltage of the second capacitor 35. In the case of 80 V<Vin≤120 V shown in FIG. 25, the power conversion device operates in control mode C. In this control mode C, one cycle of the operation of charging/discharging the DC power in the inverter circuit 20 is divided into two intervals, i.e., first to second intervals. In the first interval, the shorting switch 4 is switched ON, the smoothing capacitor 6 is bypassed, and the DC power of the inverter circuit 20 is charged. In the second interval, the shorting switch 4 is switched OFF, the DC power of the inverter circuit 20 is discharged, and the smoothing capacitor 6 is charged via the rectifier diode 5 with the sum of the voltages obtained by superimposing the voltage of the discharged DC power onto the voltage of the DC power supply 1. The boost ratio in this control mode C is 2.

For example, when the voltage Vin of the DC power supply 1 is 120 V, in the first interval, the first capacitor 25 is charged up to 40 V, and the second capacitor 35 is charged up to 80 V. In the second interval, the shorting switch 4 is switched OFF, and the smoothing capacitor 6 is charged, via the rectifier diode 5, with a DC voltage of 240 V, which is the sum of the voltage Vin of the DC power supply 1, the voltage of the first capacitor 25, and the voltage of the second capacitor 35.

In the case of 120 V<Vin≤180 V shown in FIG. 26, the power conversion device operates in control mode D. In this control mode D, one cycle of the operation of charging/discharging the DC power in the inverter circuit 20 is divided into four intervals, i.e., first to fourth intervals. In the first interval, the shorting switch 4 is switched ON, the smoothing capacitor 6 is bypassed, and the DC power of the inverter circuit 20 is charged. In the second to fourth intervals, the shorting switch 4 is switched OFF, the DC power of the inverter circuit 20 is discharged, and the smoothing capacitor 6 is charged via the rectifier diode 5 with the sum of the voltages obtained by superimposing the voltage of the discharged DC power onto the voltage of the DC power supply 1. The boost ratio in this control mode D is 1.3.

For example, when the voltage vin of the DC power supply 1 is 180 v, in the first interval, the first capacitor 25 is charged up to 60 V, and the second capacitor 35 is charged up to 120 V. In the second to fourth intervals, the shorting switch 4 is switched OFF. To begin with, in the second interval, the smoothing capacitor 6 is charged, via the rectifier diode 5, with a DC voltage of 240 V, which is the sum of the voltage Vin of the DC power supply 1 and the voltage of the first capacitor 25. In the third interval, with the sum of the voltage Vin of the DC power supply 1 and the voltage of the second capacitor 35, the first capacitor 25 is charged up to 60 V again, and in addition, the smoothing capacitor 6 is charged via the rectifier diode 5 with a DC voltage of 240 V. Then, in the fourth interval, the smoothing capacitor 6 is charged, via the rectifier diode 5, with a DC voltage of 240 V, which is the sum of the voltage Vin of the DC power supply 1 and the voltage of the first capacitor 25.

As described above, the control mode is switched among control modes A to D in accordance with the voltage Vin of the DC power supply 1, and by charging or discharging the DC power of the inverter circuit 20, boost operation is performed. The boost ratio is determined depending on the control modes, and the control mode is selected from among control modes A to D such that the lower the voltage Vin is the higher the boost ratio is, and thereby the output voltage Vo is boosted to a range of 160 V<Vo≤240 V. In addition, the control mode is selected from among control modes A to D such that variation in the output voltage Vo is suppressed even if the voltage Vin of the DC power supply 1 varies.

In this manner, the boost ratio is selected by determining and selecting one of control modes A to D in accordance with the voltage Vin of the DC power supply 1.

Figure 28:
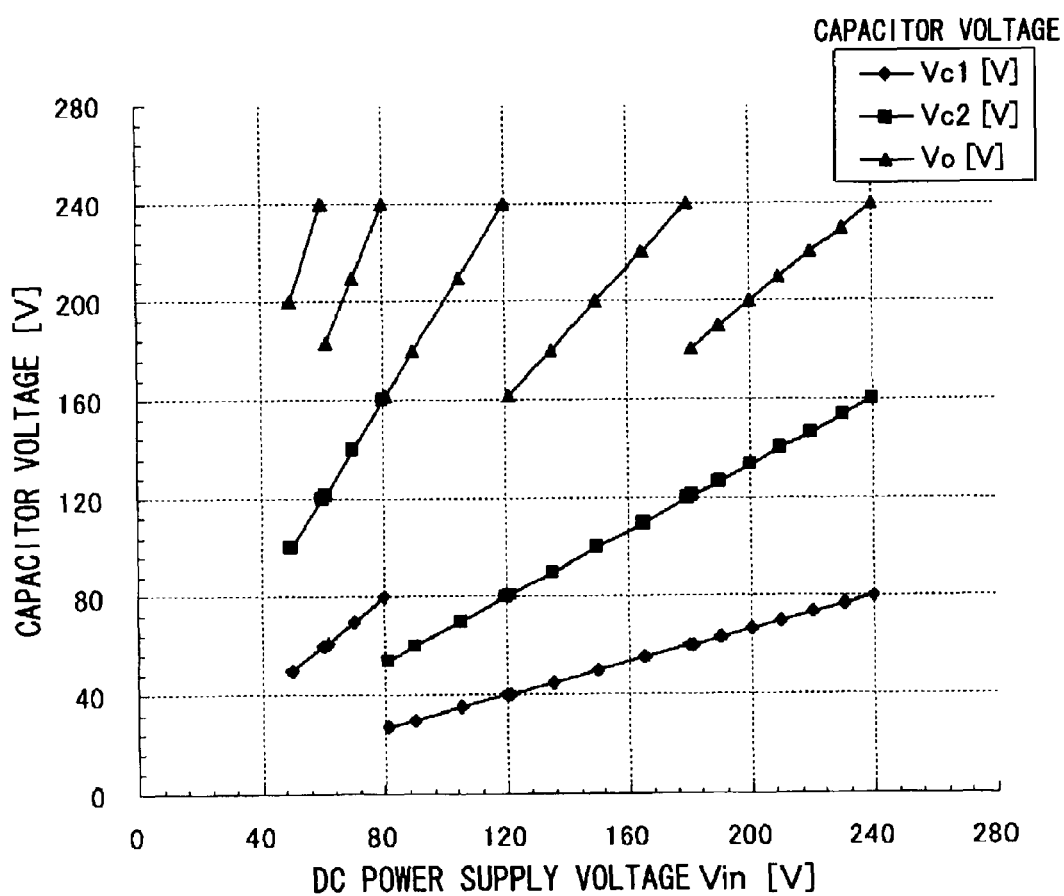
FIG. 28 is a diagram showing a relation of capacitor voltages relative to the DC power supply voltage in the power conversion device according to embodiment 5 of the present invention.

FIG. 28 shows a relation of the voltage Vc1 of the first capacitor 25, the voltage Vc2 of the second capacitor 35, and the voltage Vo (output voltage) of the smoothing capacitor 6 at the output side of the power conversion device, relative to the voltage Vin of the DC power supply 1. As shown in FIG. 28, the voltage variation rate of the output voltage Vo stays within the range of ±20%.

Further, in each of control modes A to D, outputs of the first single-phase inverter 20a and the second single-phase inverter 20b are controlled so that reception and delivery of electric power by the first capacitor 25 and the second capacitor 35 as a result of the charging/discharging operation are balanced.

As described above, one cycle in each control mode includes a plurality of intervals, and the one cycle includes intervals during which the single-phase inverters 20a and 20b output a positive voltage and intervals during which the inverters 20a and 20b output a negative voltage, except the case where the single-phase inverters 20a and 20b generate no voltage during the one cycle. Further, as shown in FIG. 23 to FIG. 26, in the one cycle, the total sum of the intervals during which each of the single-phase inverters 20a and 20b outputs a positive voltage is the same in length as the total sum of the intervals during which it outputs a negative voltage. Thus, reception and delivery of the electric power by each of the first capacitor 25 and the second capacitor 35 as a result of the charging/discharging operation during one cycle can be certainly balanced.

In this embodiment, as described above, DC/DC conversion is performed by utilizing charge/discharge of DC power of the inverter circuit 20, and thus no large-capacity reactor is required.

In addition, at the time of switching ON/OFF the shorting switch 4, the inverter circuit 20 is controlled to switch charge/discharge of the DC voltage. Thus, the shorting switch 4 and the semiconductor switch devices 21 to 24, and 31 to 34 in the inverter circuit 20 need not perform high frequency switching, and the voltage used for switching in the inverter circuit 20 can be set lower than the setting voltage of the smoothing capacitor 6. Thus, it is possible to realize a power conversion device that facilitates reduction in power loss and noise, and also facilitates downsizing and weight saving of the device.

Further, a plurality of control modes A to D are set in advance, which are based on combinations of the output control of the first and second single-phase inverters 20a and 20b, and the ON/OFF control of the shorting switch 4, and of which boost ratios are different from one another. Then, in accordance with the voltage Vin of the DC power supply 1, one of the control modes A to D is selected and switching thereto is performed. Thereafter, the output voltages of the first single-phase inverter 20a and the second single-phase inverter 20b are superimposed onto the voltage Vin of the DC power supply 1, and thereby a desired voltage is outputted to the smoothing capacitor 6.

The plurality of control modes A to D are set based on combinations of the output control of the plurality of single-phase inverters 20a and 20b, and the ON/OFF control of the shorting switch 4, and accordingly, the boost ratio which is determined depending on the control modes can be set in a broad range. In this case, four levels of boost ratio are set from 1.3 to 4. Thus, the boost ratio can be selected from a broad range, and voltage variation of the output voltage Vo can be suppressed with respect to the input voltage (voltage Vin) of a broad range, whereby a desired output voltage Vo can be obtained.

Further, outputs of the first single-phase inverter 20a and the second single-phase inverter 20b are controlled such that reception and delivery of the electric power by each of the first capacitor 25 and the second capacitor 35 as a result of the charging/discharging operation are balanced, and thus power supply to the first and second capacitor 25 and 35 or control thereof need not be performed from their outside. Accordingly, installation of a DC/DC converter is not required.

Further, the voltage range of solar batteries varies depending on not only the conditions of amount of solar irradiation and temperature, but also the number of serially connected DC power supplies that can be installed outdoors. Thus, the voltage Vin to be inputted to the power conversion device varies in a broad range. In this embodiment, a desired output voltage Vo can be obtained with respect to the broad range of input voltages (voltage Vin), which is particularly effective for the case where solar batteries are used as the DC power supply 1.

Figure 29:
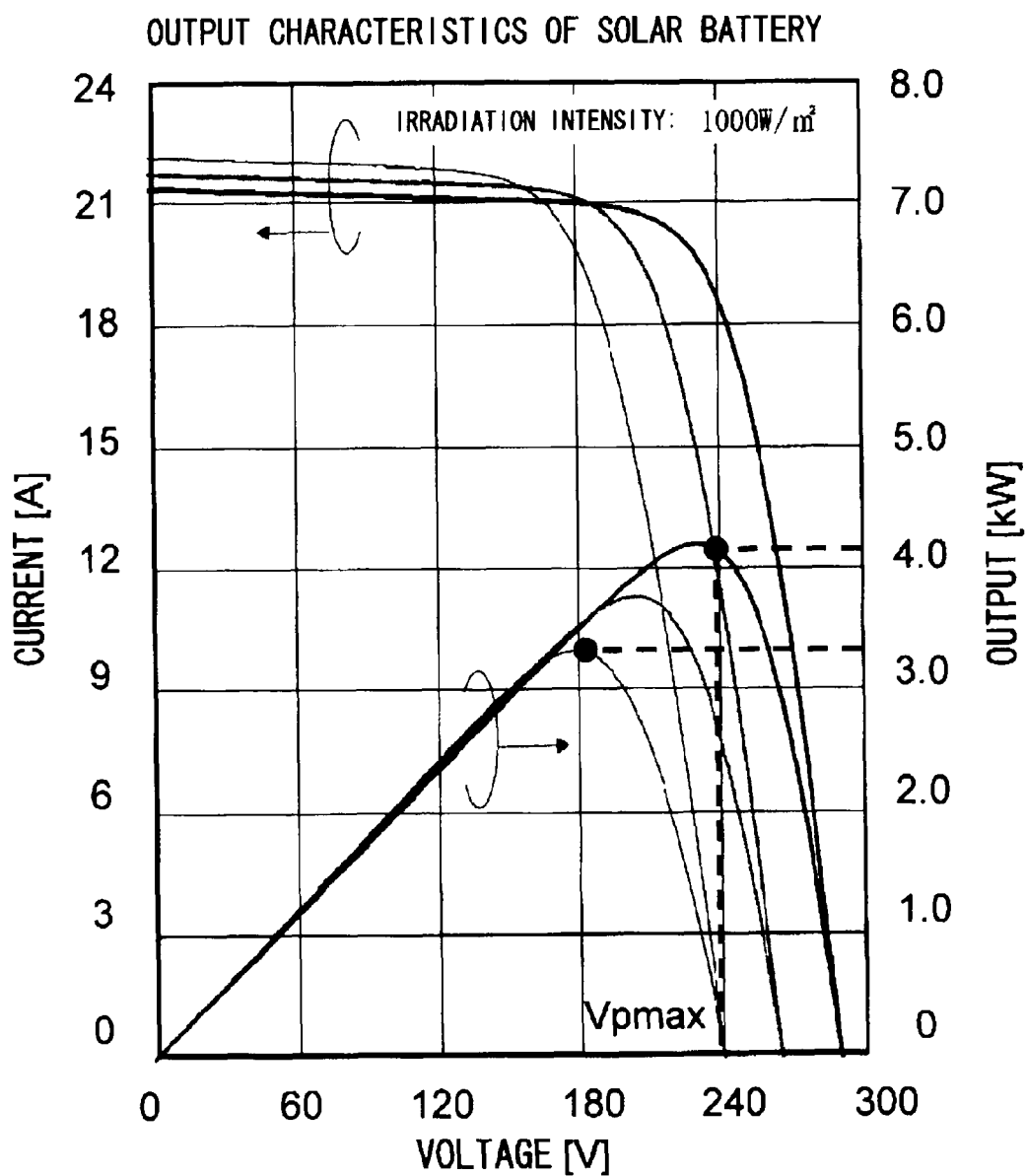
FIG. 29 is a diagram showing output characteristics of a solar battery.

FIG. 29 is a diagram showing output characteristics of solar batteries. As a method of optimizing the use of the electric power obtained from the solar batteries, an MPPT (Maximum Power Point Tracking) control is generally used, and in that case, the voltage needs to be maintained at the maximum output point Vpmax. As shown in FIG. 29, the voltage to achieve the maximum output point Vpmax varies. However, if the MPPT control of solar batteries is also applied in this embodiment in which a desired output voltage Vo can be obtained with respect to the input voltage which varies in a broad range, effective use of the electric power can be accelerated.

It should be noted that the duty ratios of the positive/negative voltage outputs of the first and second single-phase inverters 20a and 20b may be set adjustable without changing the shorting switch 4 ON/OFF control which determines charge/discharge of the whole inverter circuit 20. In this case, since it is possible to change the ratio of voltages of the first capacitor 25 and the second capacitor 35 respectively included in the first single-phase inverter 20a and the second single-phase inverter 20b, the voltage ratio is adjustable even if the ratio of the respective voltages of the first capacitor 25 and the second capacitor 35 deviates from the setting value due to influences of loss elements in the circuits, dead time, and the like. For example, in the case of control in control mode A shown in FIG. 23, in charge intervals for charging the inverter circuit 20, if the positive voltage output periods for the first single-phase inverter 20a and the negative voltage output periods for the second single-phase inverter 20b are adjusted to be longer (shorter), the voltage of the first capacitor 25 can be adjusted to be lower (higher), and the voltage of the second capacitor 35 can be adjusted to be higher (lower). Accordingly, the voltage ratio can be adjusted.

Embodiment 6

Next, embodiment 6 of the present invention will be described.

In above-described embodiment 5, the ratio of the setting voltage Vc1 of the first capacitor 25 in the first single-phase inverter 20a to the setting voltage Vc2 of the second capacitor 35 in the second single-phase inverter 20b is fixed to 1:2. However, in this embodiment 6, the ratio is set variable. It should be noted that the main circuit configuration is the same as in embodiment 5.

Similarly to embodiment 5, for the power conversion device, a plurality of control modes are set in advance, which are based on the combinations of the output control of the first and second single-phase inverters 20a and 20b, and the ON/OFF control of the shorting switch 4. In accordance with the voltage Vin of the DC power supply 1, one of the control modes is selected and switching thereto is performed. In this case, control modes A to E are to be used. Control modes A to D which are similar to those in embodiment 5, and control mode E to be described later are to be used. In addition, control mode E is to be used in the case where the voltage Vin of the DC power supply 1 is 120 V<Vin≤160 V, and control mode D is to be used in the case where the voltage Vin of the DC power supply 1 is 160 V<Vin≤180 V. Control modes A to C are to be used in the same manner as in embodiment 5.

Figure 30:
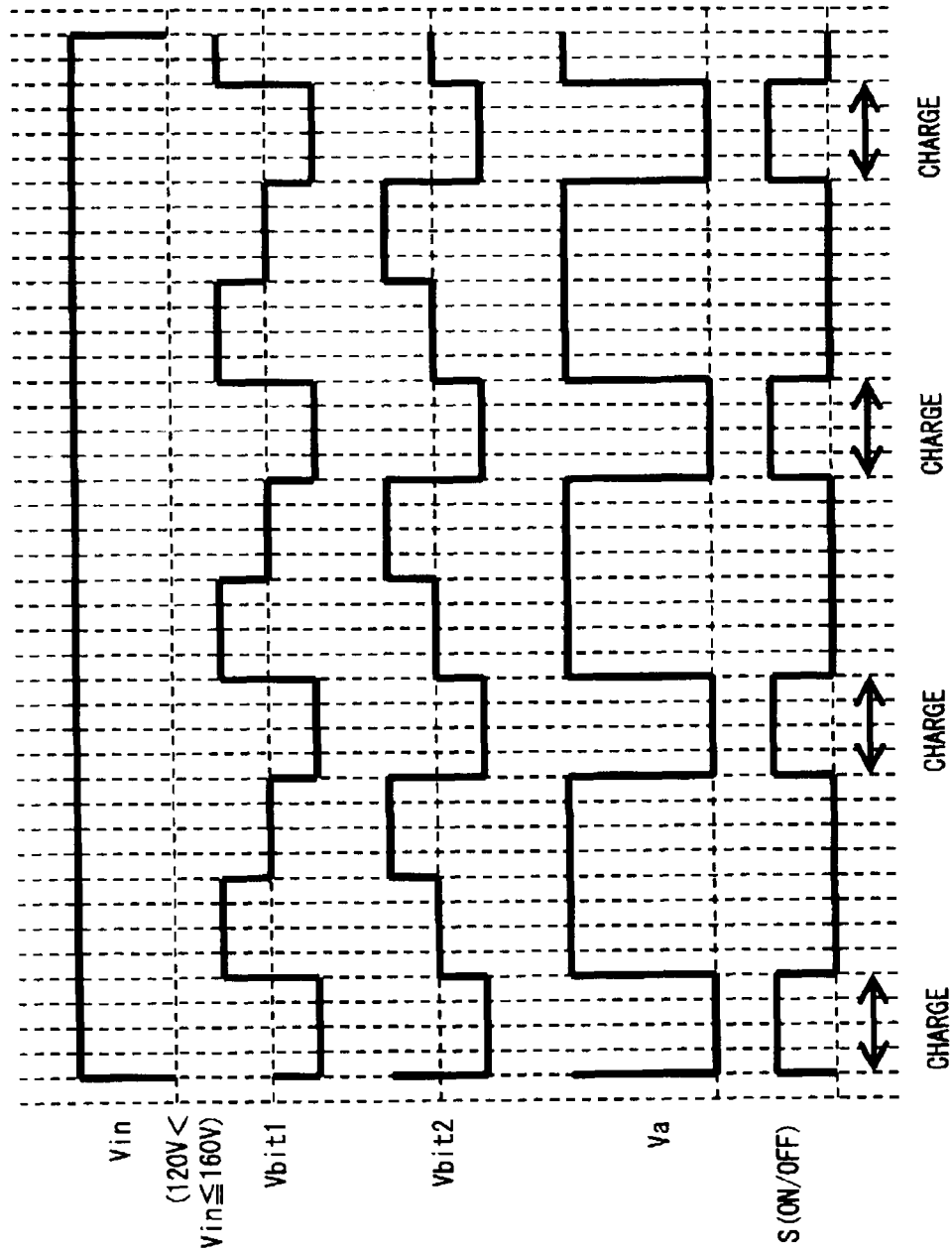
FIG. 30 is a waveform chart illustrating an operation of a power conversion device in a control mode E according to embodiment 6 of the present invention.

An operation based on control mode E in the case of 120 V<Vin≤160 V will be described with reference to FIG. 30. In this control mode E, one cycle of the operation of charging/discharging the DC power in the inverter circuit 20 is divided into three intervals, i.e., first to third intervals. In the first interval, the shorting switch 4 is switched ON, the smoothing capacitor 6 is bypassed, and the DC power of the inverter circuit 20 is charged. In the second and third intervals, the shorting switch 4 is switched OFF, the DC power of the inverter circuit 20 is discharged, and the smoothing capacitor 6 is charged via the rectifier diode 5 with the sum of the voltages obtained by superimposing the voltage of the discharged DC power onto the voltage of the DC power supply 1. In this control mode E, the ratio of the setting voltage Vc1 of the first capacitor 25 to the setting voltage Vc2 of the second capacitor 35 is 1:1, and the boost ratio is 1.5.

For example, when the voltage Vin of the DC power supply 1 is 160 V, in the first interval, the first capacitor 25 and the second capacitor 35 are each charged up to 80 V. In the second and third intervals, the shorting switch 4 is switched OFF. In the second interval, the smoothing capacitor 6 is charged, via the rectifier diode 5, with a DC voltage of 240 V, which is the sum of the voltage Vin of the DC power supply 1 and the voltage of the first capacitor 25. In the third interval, the smoothing capacitor 6 is charged, via the rectifier diode 5, with a DC voltage of 240 V, which is the sum of the voltage Vin of the DC power supply 1 and the voltage of the second capacitor 35.

In this case as well, outputs of the first single-phase inverter 20a and the second single-phase inverter 20b are controlled so that the reception and delivery of the electric power by each of the first capacitor 25 and the second capacitor 35 as a result of the charging/discharging operation are balanced.

Figure 31:
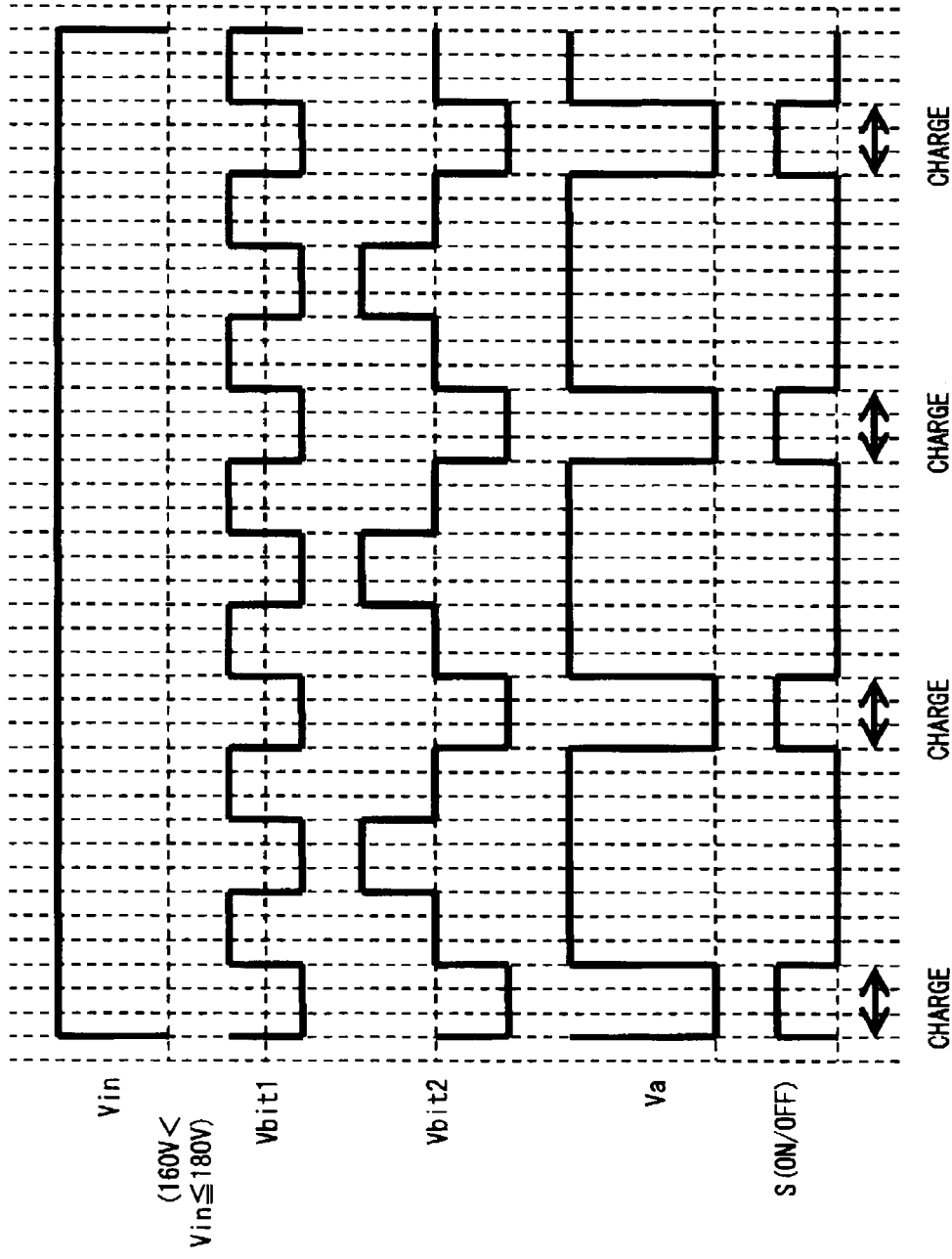
FIG. 31 is a waveform chart illustrating an operation of the power conversion device in a control mode D according to embodiment 6 of the present invention.

FIG. 31 is a diagram showing an operation in control mode D in the case of 160 V<Vin≤180 V. The details other than the voltage range of the DC power supply 1 are the same as in embodiment 5, and the ratio of the setting voltage Vc1 of the first capacitor 25 to the setting voltage Vc2 of the second capacitor 35 is 1:2, and the boost ratio is 1.3.

In addition, FIG. 32 shows a list of the above-described operations. It should be noted that, for convenience, FIG. 32 shows cases where the voltage Vin are 50 V, 60 V, 70 V, 80 V, 90 V, 105 V, 120 V, 130 V 140 V, 150 V, 160 V 165 V, and 180 V.

Figure 33:
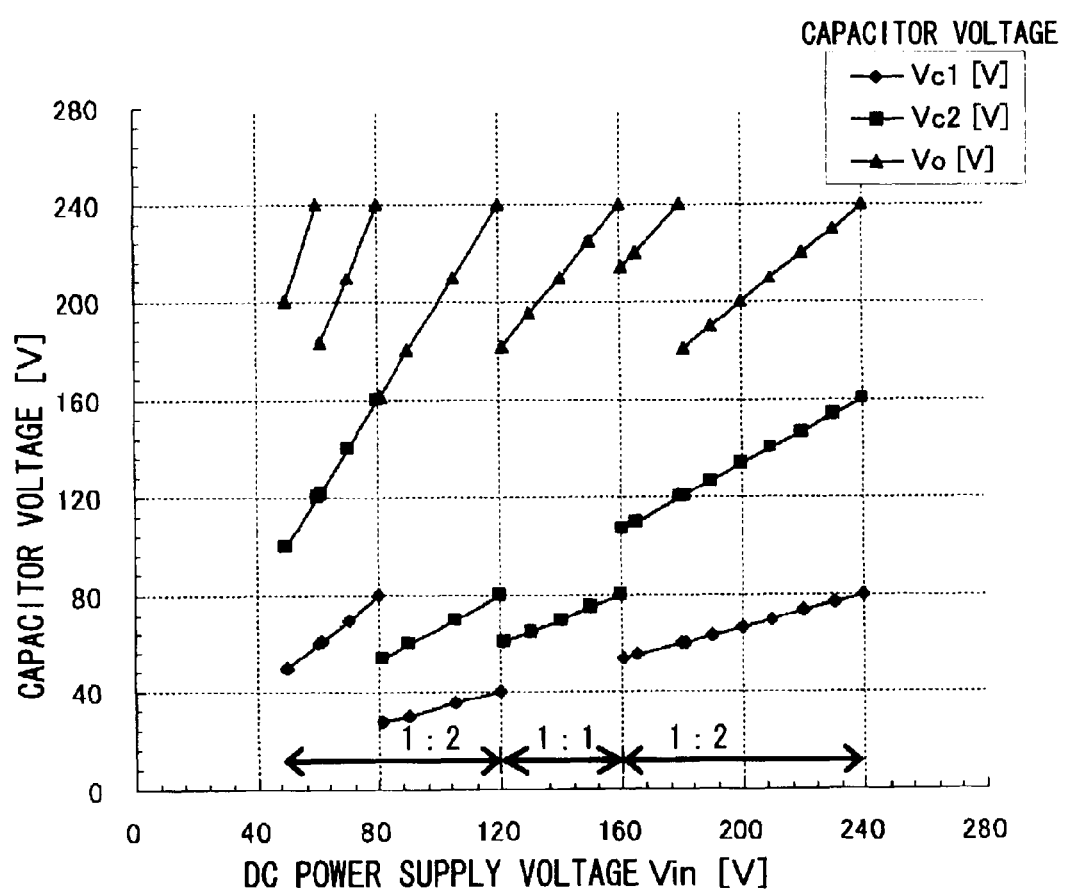
FIG. 33 is a diagram showing a relation of capacitor voltages relative to the DC power supply voltage in the power conversion device according to embodiment 6 of the present invention.

FIG. 33 shows a relation of the voltage Vc1 of the first capacitor 25, the voltage Vc2 of the second capacitor 35, and the voltage Vo (output voltage) of the smoothing capacitor 6 at the output side of the power conversion device, relative to the voltage Vin of the DC power supply 1. The ratios in the diagram represent the ratio of the voltage of the first capacitor 25 to the voltage of the second capacitor 35. The ratio is 1:1 in the case of 120 V<Vin≤160 V, and is 1:2 in the other cases. As shown in FIG. 33, the voltage variation rate of the output voltage Vo stays in a narrower range as compared to the case in embodiment 5.

As described above, the control mode is switched among control modes A to E in accordance with the voltage Vin of the DC power supply 1, and by charging or discharging the DC power of the inverter circuit 20, boost operation is performed. The boost ratio is determined depending on the control modes, and the control mode is selected from among control modes A to E such that the lower the voltage Vin is the higher the boost ratio is, and such that variation in the output voltage Vo is suppressed even if the voltage Vin of the DC power supply 1 varies, and thereby the output voltage V0 is boosted to a range of 160 V<Vo≤240 V. That is, the boost ratio is selected in accordance with the voltage Vin, one of control modes A to E is determined based on the selected boost ratio, and thereby the power conversion device is controlled.

In this embodiment, similar effects to those in embodiment 5 can be obtained. In addition, since the ratio of the voltage of the first capacitor 25 to that of the second capacitor 35 is set variable, it is possible to increase the number of settable control modes and the number of levels of boost ratios. In this case, the ratio of the voltage of the first capacitor 25 to that of the second capacitor 35 has two types, i.e., 1:1 and 1:2, and five boost ratios are set based on control modes A to E. Accordingly, the boost ratio is selectable from a larger number of levels of boost ratios, and the voltage variation of the output voltage Vo can be further suppressed.

It should be noted that, in embodiments 5 and 6, the rectifier diode 5 is connected, as a semiconductor device that determines conduction/non-conduction, in the stage subsequent to the inverter circuit 20. However, as illustrated in FIG. 16 of embodiment 1, the semiconductor switch 9 may be used in place of the rectifier diode 5. The semiconductor switch 9 is controlled such that its ON/OFF state is reverse to that of the shorting switch 4. That is, when the shorting switch 4 is in an ON state, the semiconductor switch 9 is in an OFF state, and the DC voltage of the inverter circuit 20 is charged while the smoothing capacitor 6 is bypassed. Then, when the shorting switch 4 is in an OFF state, the charged energy is used to be discharged to the smoothing capacitor 6 by switching the semiconductor switch 9 ON.

In addition, in above-described embodiments 5 and 6, the first and second single-phase inverters in the inverter circuit 20 may include diodes in place of the semiconductor switch devices 21, 24, 31, and 34, and similar effects can be obtained with such configuration. In addition, in the embodiments, the cathode side of the rectifier diode 5 is connected to the positive terminal of the smoothing capacitor 6 in the output stage. However, the rectifier diode 5 may be arranged on the negative terminal side of the smoothing capacitor 6 such that the negative terminal of the smoothing capacitor 6 is connected to the anode side of the rectifier diode 5.

Further, in above-described embodiments 5 and 6, one end of the shorting switch 4 is connected to the AC output line of the inverter circuit 20. However, as described in embodiment 2, one end of the shorting switch 4a may be connected to the negative terminal of the second capacitor 35, i.e., the last stage single-phase inverter (in this case, the second single-phase inverter 30b), in the inverter circuit 20. In this case, the last stage second single-phase inverter 30b may be a half-bridge single-phase inverter, and the other end of the shorting switch 4a is connected to the negative terminal of the smoothing capacitor 6 in the same manner as in embodiments 5 and 6. In addition, the anode of the rectifier diode 5 is connected to the positive terminal of the second capacitor 35, and the cathode thereof is connected to the positive terminal of the smoothing capacitor 6.

Accordingly, regardless of whether the shorting switch 4a is switched ON or OFF, the number of elements through which current passes can be reduced, the conduction loss can be reduced, and the conversion efficiency of the whole power conversion device can be improved. In addition, the single-phase inverter 30b in the last stage can be configured with a half-bridge single-phase inverter, which enhances simplification of the circuit configuration.

Embodiment 7

In above-described embodiment 5 and 6, the inverter circuit 20 is composed of two single-phase inverters, but may be composed of three or more single-phase inverters with their AC sides connected in series to one another.

Figure 34:
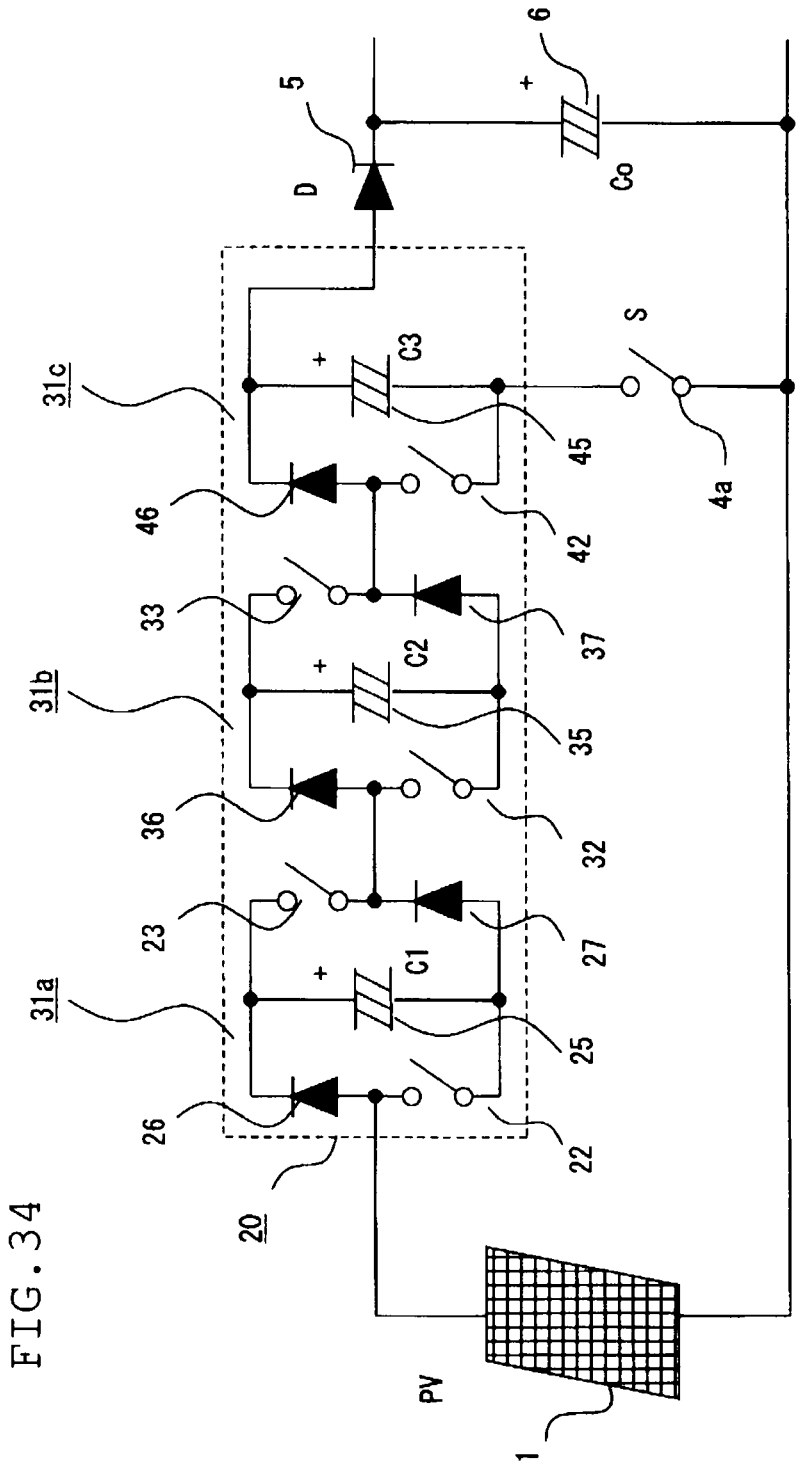
FIG. 34 is a configuration diagram of a main circuit of a power conversion device according to embodiment 7 of the present invention.

FIG. 34 is a configuration diagram of the main circuit of a power conversion device according to embodiment 7 of the present invention.

As illustrated in FIG. 34, to the output of the DC power supply 1 formed of a solar battery or the like, an AC side of the inverter circuit 20 is connected in series. The inverter circuit 20 is composed of first to third single-phase inverters 31a to 31c with their AC sides connected in series to one another, and superimposes, as an output from the inverter circuit 20, a total sum of outputs from the single-phase inverters 31a to 31c onto a DC voltage from the DC power supply 1. The first single-phase inverter 31a in the inverter circuit 20 includes the semiconductor switch devices 22 and 23, the diodes 26 and 27, and the first capacitor 25 functioning as a DC voltage source, whereas the second single-phase inverter 31b includes the semiconductor switch devices 32 and 33, the diodes 36 and 37, and the second capacitor 35 functioning as a DC voltage source. In addition, the third single-phase inverter 31c which is in the last stage is configured as a half-bridge single-phase inverter that includes a semiconductor switch device 42, a diode 46, and a third capacitor 45.

In addition, the smoothing capacitor 6 is connected to the inverter circuit 20 via the rectifier diode 5, as a stage subsequent to the inverter circuit 20, and a shorting switch 4a is connected between the negative terminal of the third capacitor 45 and the negative terminal of the smoothing capacitor 6.

In the same manner as in above-described embodiments 5 and 6, for the power conversion device, a plurality of control modes are set in advance, which are based on combinations of the output control of the first to third single-phase inverters 31a to 31c, and the ON/OFF control of the shorting switch 4a. In accordance with the voltage Vin of the DC power supply 1, one of the control modes is selected and switching thereto is performed.

Then, of voltage values Vc (k) of the plurality (in this case, three) of capacitors 25, 35, and 45, a voltage Vc (N) which is the maximum voltage and a voltage Vc (1) which is the minimum voltage are controlled to satisfy the relational expression below.

$$Vc(N) \leq (\Sigma Vc(k): k=1 \sim N-1) + Vc(1)$$

It should be noted that, in above-described embodiments 5 and 6 as well, the ratio of the voltages of two capacitors, i.e., the capacitor 25 and the capacitor 35 is 1:2 or 1:1, both of which satisfy the above relational expression.

Figure 35:
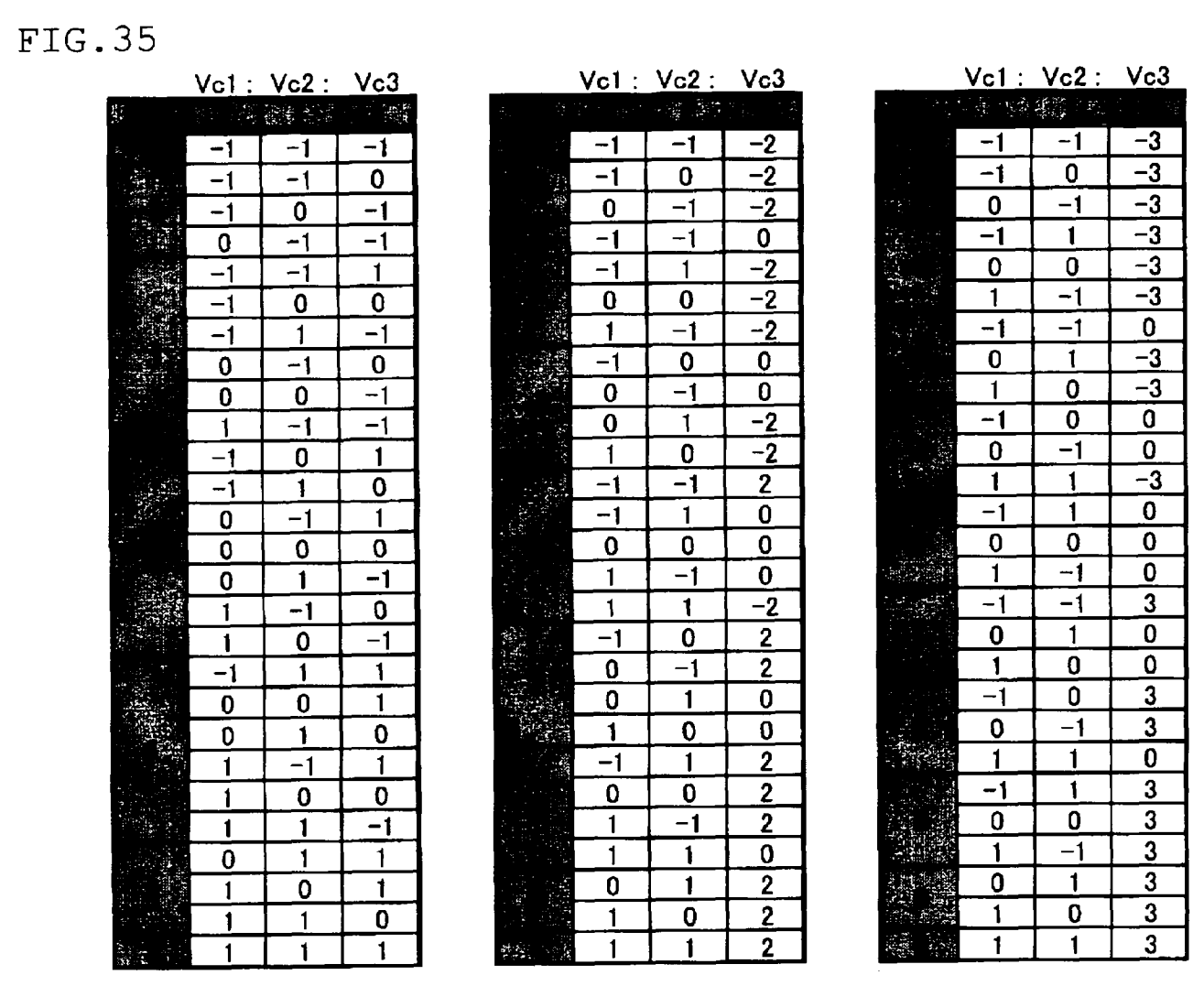
Figure 36:
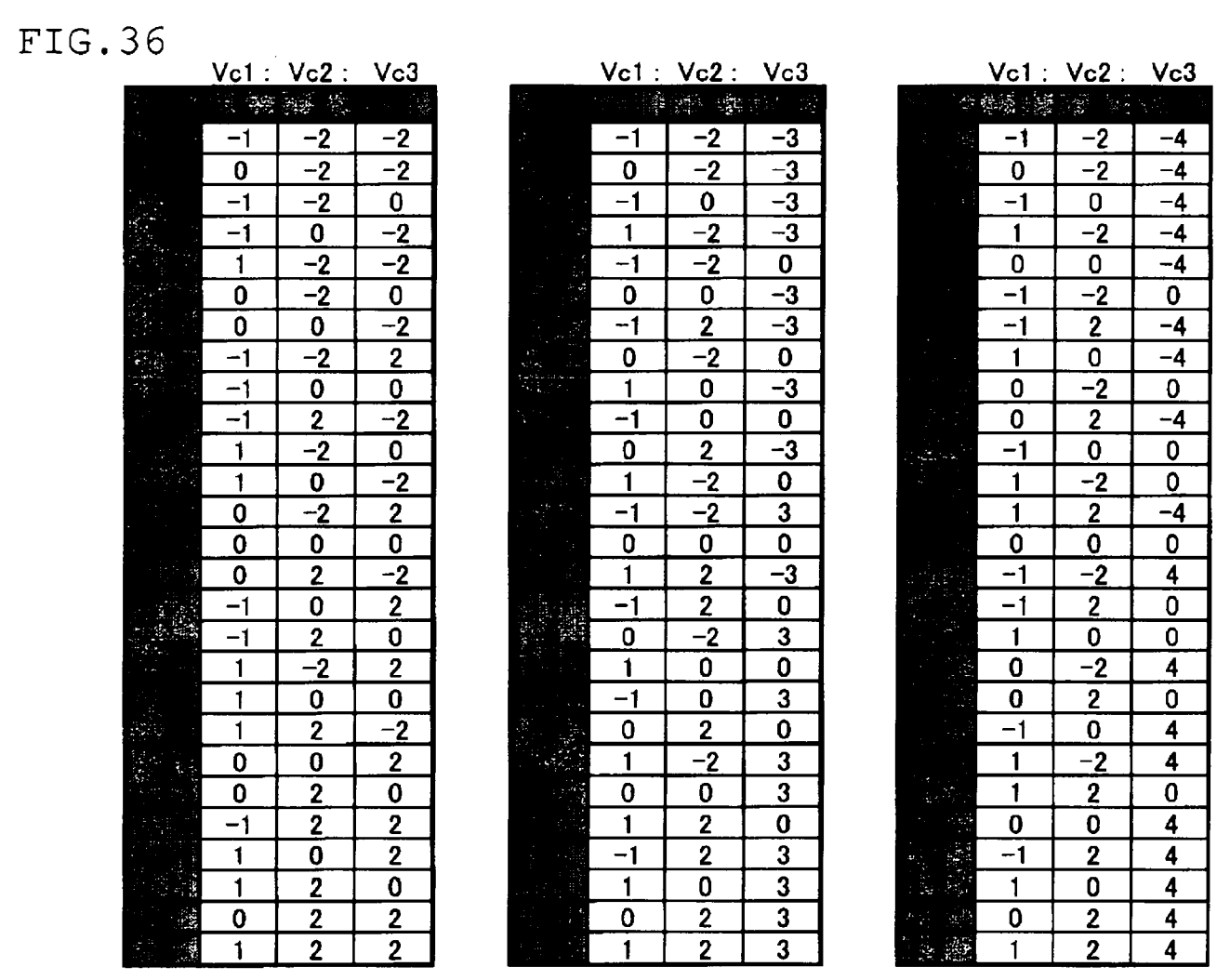

In the case where the voltages Vc1, Vc2, and Vc3 of the first to third capacitors 25, 35, and 45 satisfy the above relational expression, for example, in the case where the voltage ratio is in a range of 1:1:1 to 1:2:4, possible voltage levels of the total output voltage Vb (Vb=Va−Vin) of the inverter circuit 20 are shown in FIG. 35 and FIG. 36. In this manner, the voltages of the first to third capacitors 25, 35, and 45 are controlled to satisfy the above relational expression, whereby continuous values can be selected as the total output voltage of the inverter circuit 20. Accordingly, the number of settable control modes and the number of levels of boost ratios can be secured.

It should be noted that, the ratio of the voltages of the capacitors 25, 35, and 45 is determined in accordance with the control modes, and thus by controlling the power conversion device with the use of the control modes, the ratio of the voltages of the capacitors 25, 35, and 45 can also be controlled.

Figure 37:
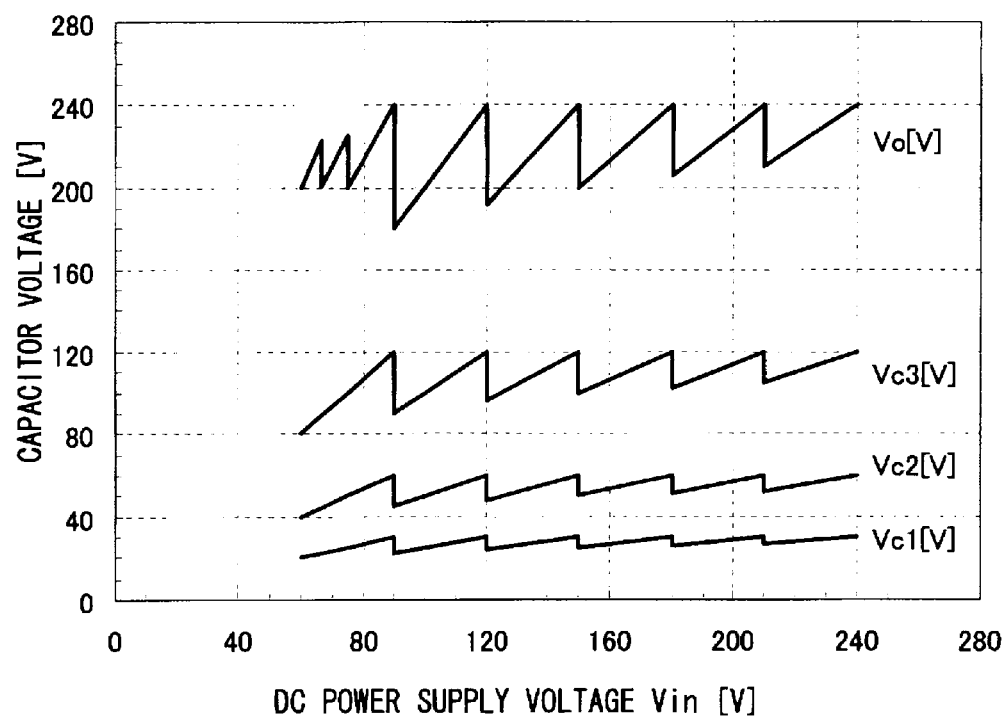
FIG. 37 is a diagram showing a relation of capacitor voltages relative to the DC power supply voltage in the power conversion device according to embodiment 7 of the present invention.

FIG. 37 shows a relation of the voltages Vc1, Vc2, and Vc3 of the capacitors 25, 35, and 45 and the voltage Vo (output voltage) of the smoothing capacitor 6 at the output side of the power conversion device, relative to the voltage Vin of the DC power supply 1 in the case where the ratio of the voltages of the first to third capacitors 25, 35, and 45 is fixed to 1:2:4. As shown in FIG. 37, one of eight levels of boost ratios is selected in accordance with the voltage Vin, and control is performed based on the corresponding one of eight control modes. Accordingly, the voltage variation rate of the output voltage Vo stays in a range of ±14%.

In this manner, with increase in the number of the serially connected single-phase inverters 31a to 31c, a larger number of levels of boost ratios can be selected, and the voltage variation rate can be reduced.

Figure 38:
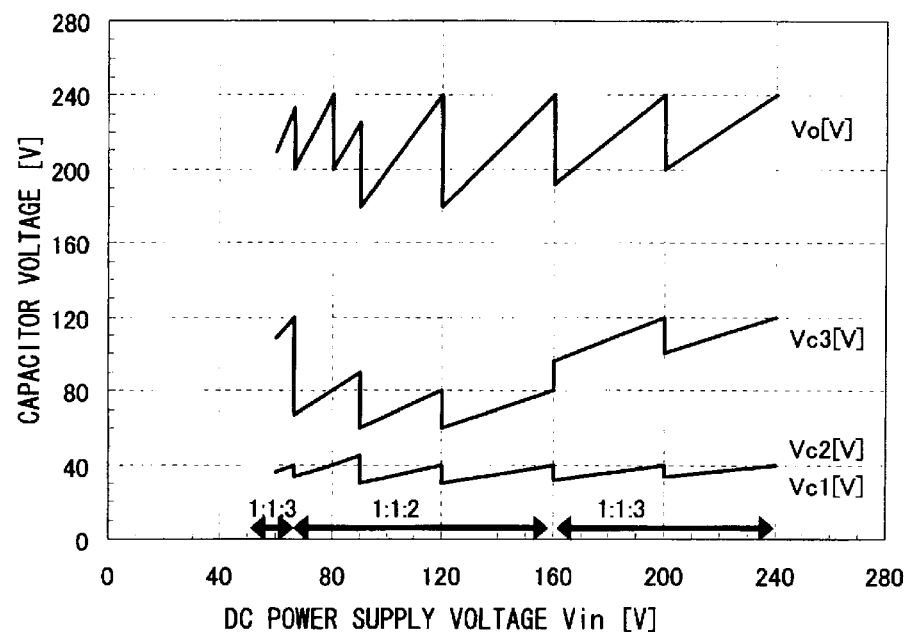
FIG. 38 is a diagram showing a relation of capacitor voltages relative to the DC power supply voltage in the power conversion device according to a modified example of embodiment 7 of the present invention.

Next, a case will be described where the ratio of the voltages of the first to third capacitors 25, 35, and 45 are set variable, and the power conversion device is controlled based on a control mode in which the voltage ratio has two types, i.e., 1:1:2 and 1:1:3. FIG. 38 shows a relation of the voltage Vc1, Vc2, and Vc3 of the capacitors 25, 35, and 45 and the voltage Vo (output voltage) of the smoothing capacitor 6 at the output side of the device, relative to the voltage Vin of the DC power supply 1. The ratios in the diagram represent the ratio of the voltages of the capacitors 25, 35, and 45. As shown in FIG. 38, one of seven levels of boost ratios is selected in accordance with the voltage Vin, and control is performed based on the corresponding one of the seven control modes. Accordingly, the voltage variation rate of the output voltage Vo stays in a range of ±14%.

In this case as well, with increase in the number of the serially connected single-phase inverters 31a to 31c, a larger number of levels of boost ratios can be selected, and the voltage variation rate can be reduced. In addition, since the ratio of the voltages of the first to third capacitors 25, 35 and 45 are set variable, the number of settable control modes and the number of levels of boost ratios can be increased. In this case, as compared to the case where the ratio is fixed to either 1:1:2 or 1:1:3, a larger number of levels of boost ratios is selectable, and the voltage variation of the output voltage Vo can be further suppressed.

Embodiment 8

Next, a power conversion device according to embodiment 8 of the present invention will be described with reference to FIG. 39. The main circuit of the power conversion device has the same configuration as that illustrated in FIG. 18 of embodiment 2.

Figure 39:
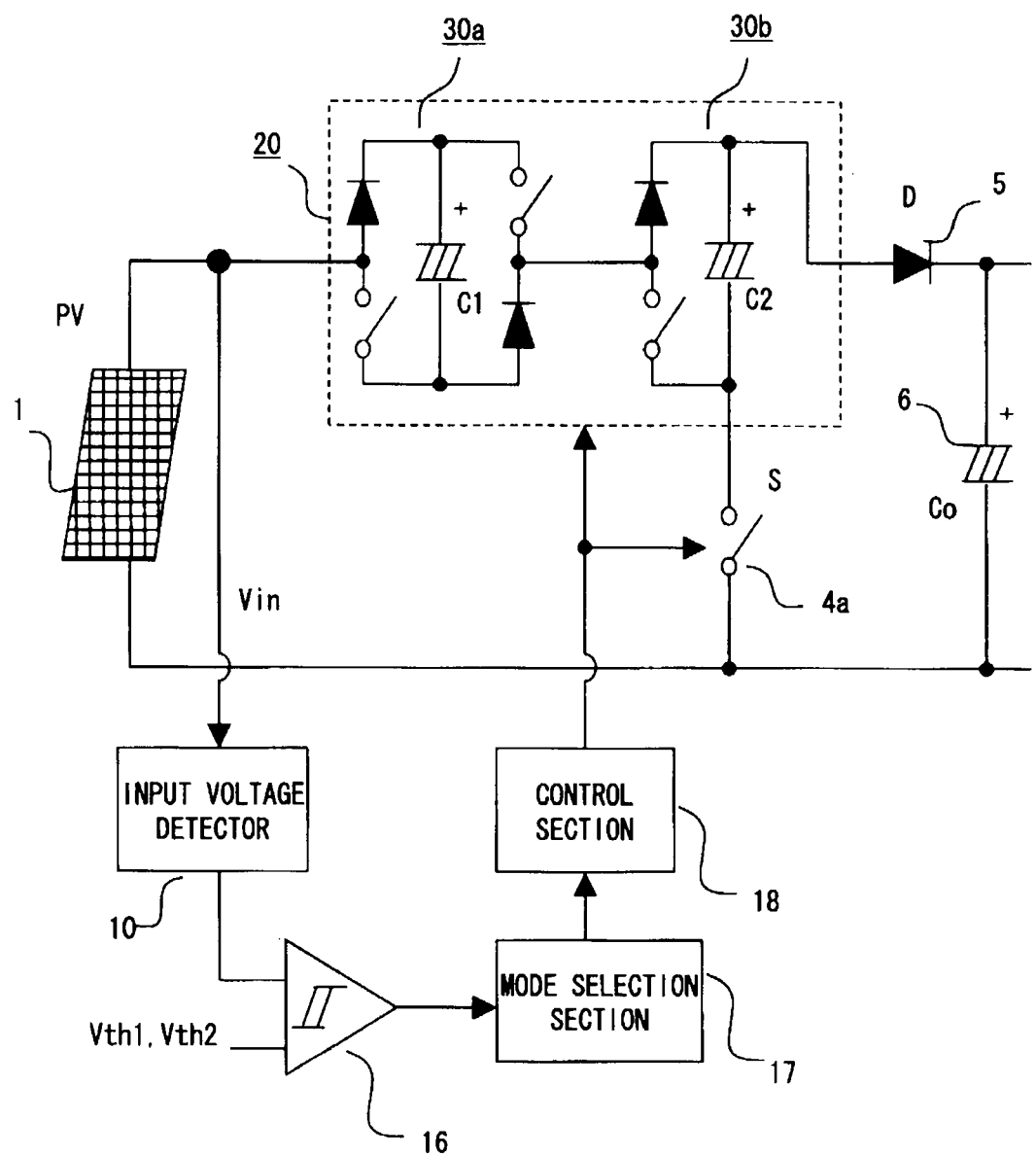
FIG. 39 is a configuration diagram of a power conversion device according to embodiment 8 of the present invention.

As illustrated in FIG. 39, the power conversion device includes: the input voltage detector 10 detecting a voltage Vin from the DC power supply 1, a hysteresis comparator 16 comparing the voltage Vin with voltage threshold Vths (Vth1, Vth2) as voltage determination values set in advance; a mode selection section 17 for switching control modes; and a control section 18. The control section 18 controls the semiconductor switch devices of the single-phase inverters 30a and 30b in the inverter circuit 20 and the shorting switch 4a, based on the control mode selected by an output signal from the mode selection section 17. Here, the mode selection section 17 and the control section 18 are configured with, for example, a microcomputer, a digital signal processor, or the like.

Figure 40:
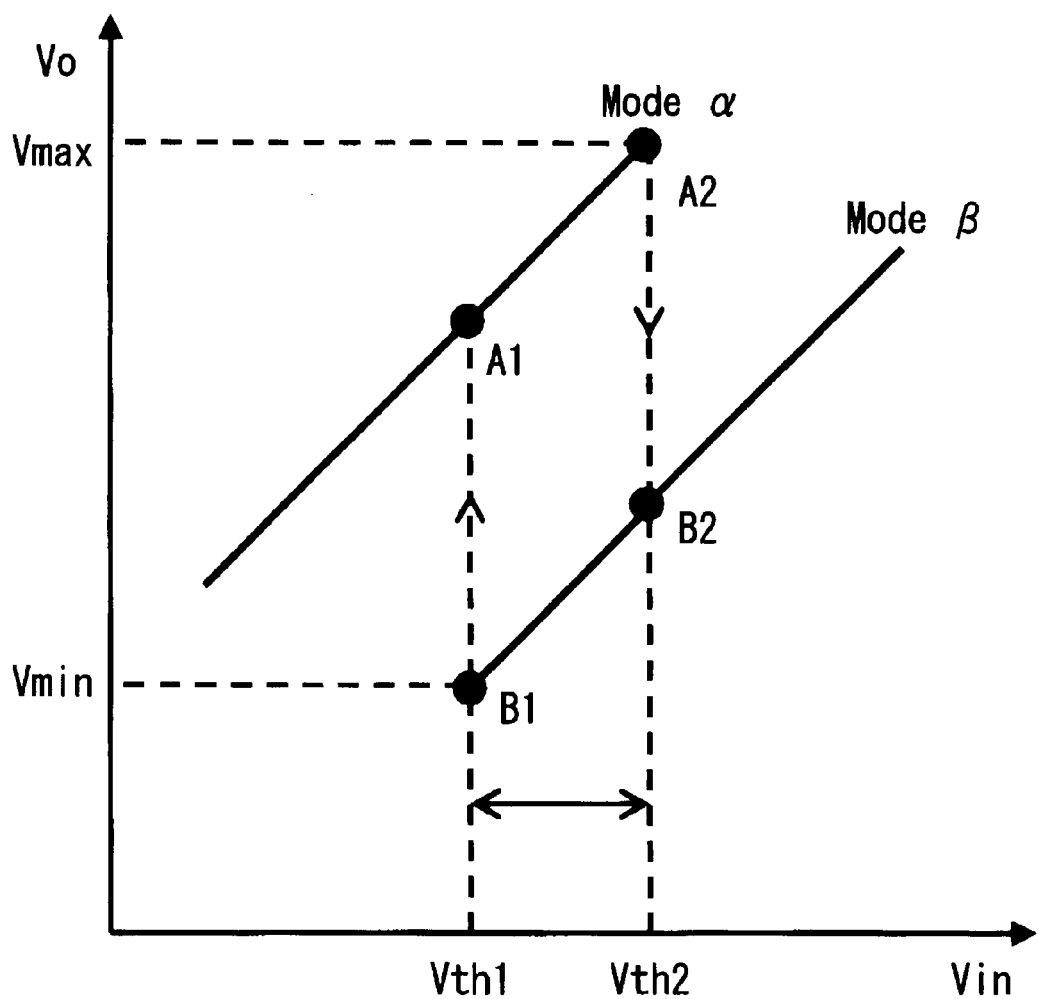
FIG. 40 is a diagram illustrating a control mode switching operation according to embodiment 8 of the present invention.

Switching operations of the respective control modes will be described with reference to FIG. 40. Here, Vth1<Vth2 is employed.

To begin with, it will be assumed that the power conversion device is controlled in a control mode a to output voltage. The output voltage Vo increases with increase in the inputted voltage Vin, and when the voltage Vin reaches the voltage threshold Vth2, the control mode is switched to control mode p to lower the boost ratio of the power conversion device. Accordingly, the operating point in the diagram shifts from A2 to B2. Thereafter, even if the voltage Vin is lowered, the control in control mode p continues. When the voltage is lowered to the voltage threshold Vth1, the control mode is switched to control mode α to raise the boost ratio of the power conversion device. Accordingly, the operating point in the diagram shifts from B1 to A1.

Figure 41:
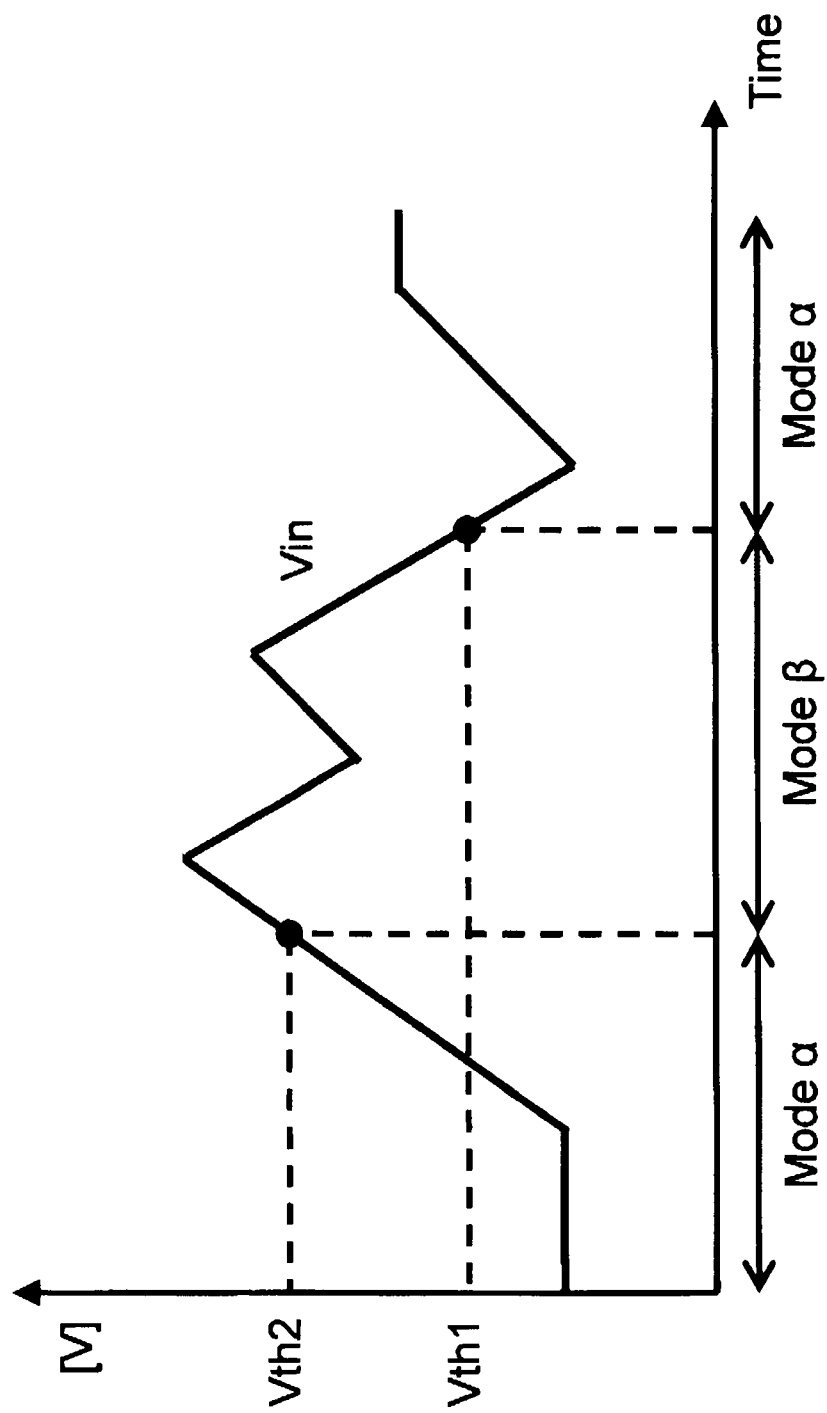
FIG. 41 is a diagram illustrating a control mode switching operation according to embodiment 8 of the present invention.
Figure 42:
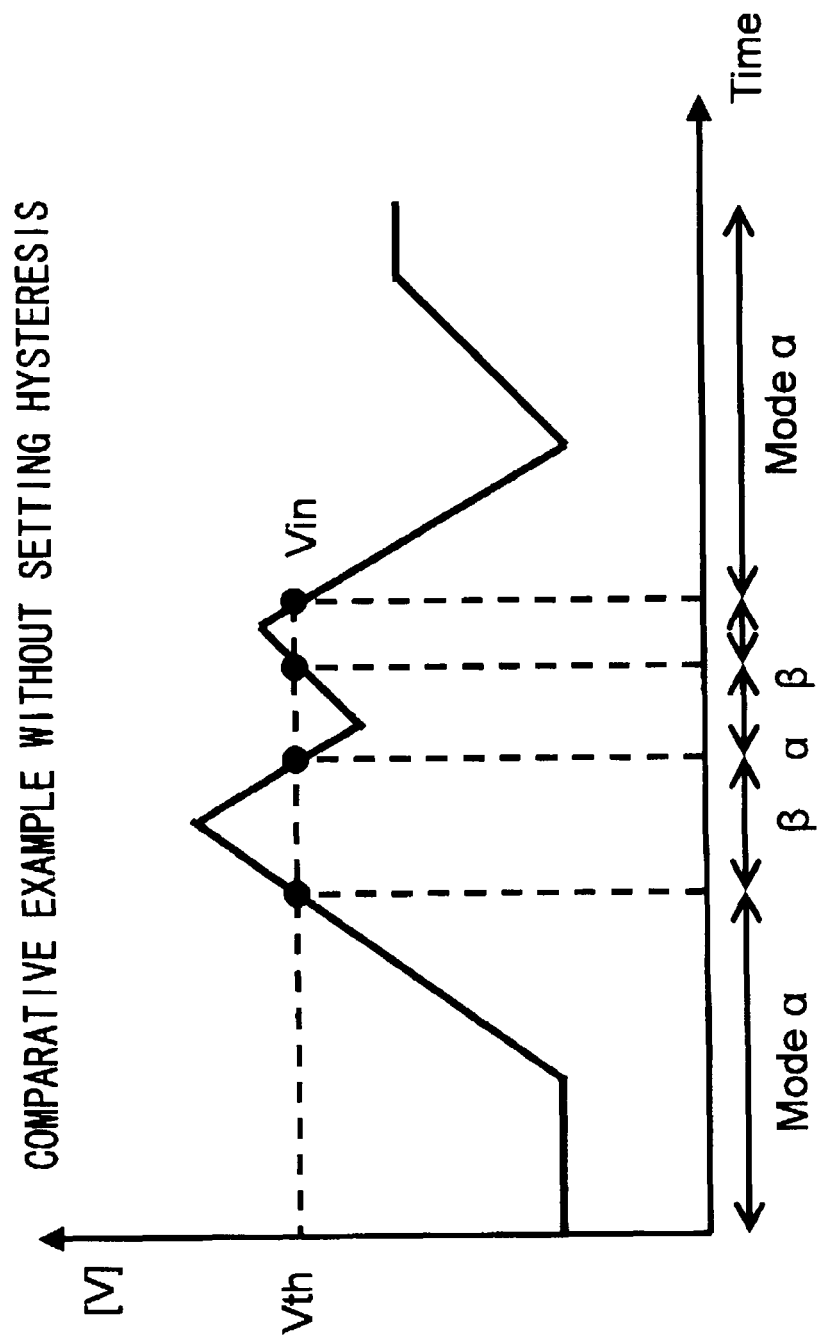
FIG. 42 is a diagram illustrating a comparative example for the example in FIG. 41.

The voltage Vin inputted from the DC power supply 1 such as a solar battery varies broadly. However, in this embodiment, since a hysteresis width is set for the voltage thresholds (Vth1 and Vth2) for control mode switching, it is possible to prevent frequent switching among control modes, as shown in FIG. 41. In addition, it is possible to avoid unstable output. In the case shown in FIG. 41, control mode switching is performed twice. On the other hand, in the case of FIG. 42, which shows a comparative example of without setting the hysteresis width, control mode switching is performed four times while the voltage Vin is the same as that in FIG. 41.

For example, in above-described embodiment 6, switching between control mode C and control mode E is performed when the input voltage Vin is 120 V (see FIG. 33). In this embodiment, Vth1 and Vth2 are set by employing the hysteresis width of 5 to 10 V, and thus stable output can be achieved.

It should be noted that in this embodiment, the voltage thresholds (Vth1 and Vth2) for switching between two control modes is described. However, the number of the voltage thresholds for control mode switching depends on the number of control modes.

Figure 43:
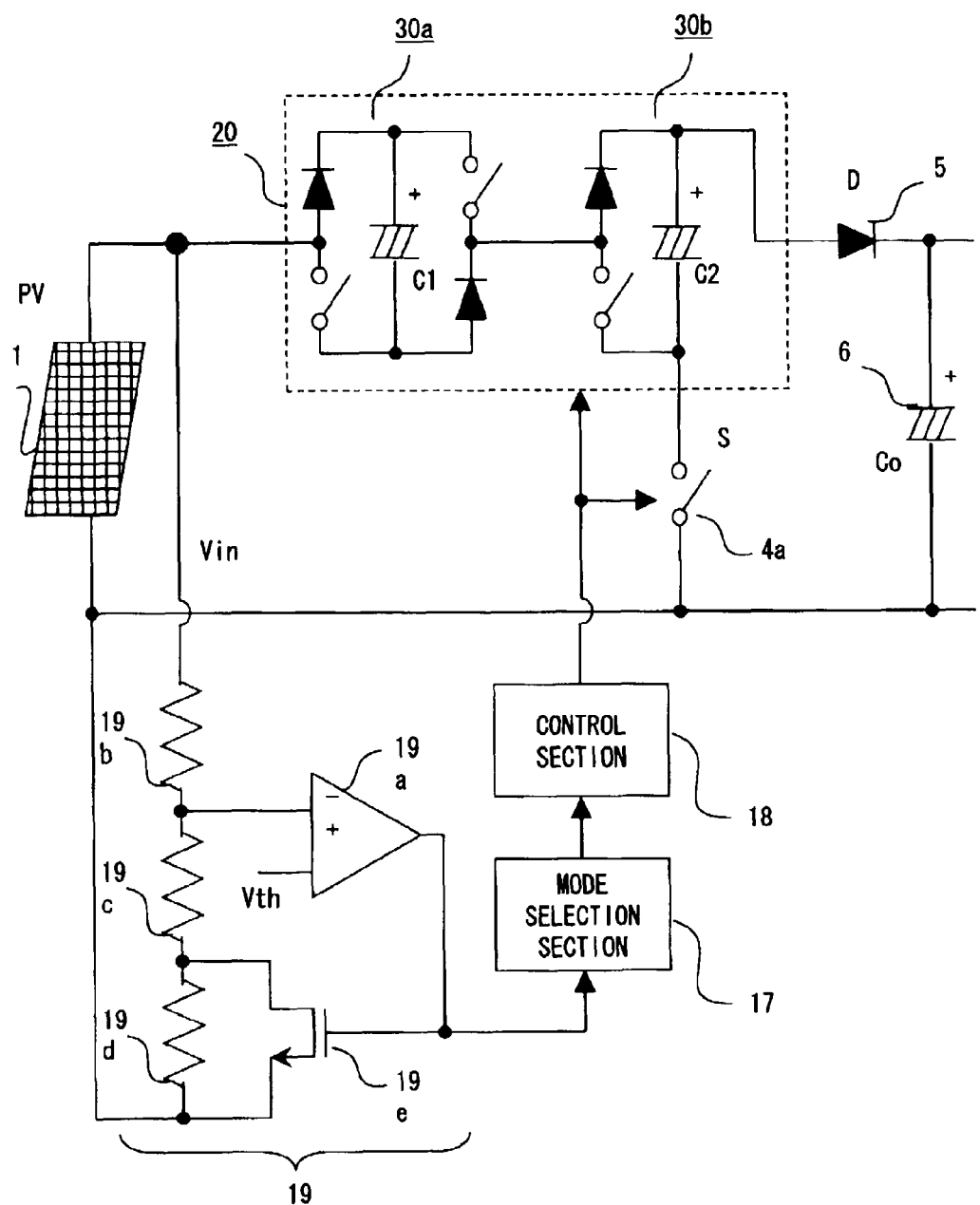
FIG. 43 is a configuration diagram of a power conversion device according to a modified example of embodiment 8 of the present invention.

In addition, the hysteresis comparator may be configured as illustrated in FIG. 43.

As illustrated in FIG. 43, the hysteresis comparator 19 includes a comparator 19a, voltage dividing resistors 19b to 19d, and a transistor 19e. In this case, the transistor 19e is switched ON/OFF based on an output signal of the comparator 19a, and the ratio of the voltage dividing resistors 19b to 19d which detect the inputted voltage Vin is changed by means of the transistor 19e, whereby the hysteresis characteristic is realized. The comparator 19a can detect the voltage Vin by using the voltage threshold Vth1 when the voltage Vin lowers, and by using the voltage threshold Vth2 (>Vth1) when the voltage Vin rises. In this case as well, by employing the hysteresis width (Vth2−Vth1), output from the power conversion device can be stabilized.

The invention claimed is:

1. A power conversion device comprising:
an inverter circuit
including a plurality of single-phase inverters which each include at least one semiconductor switch device and a DC voltage source, and which are connected in series at their AC sides, and
having an AC side connected in series to an output of a DC power supply thereby to superimpose a total sum of outputs of the single-phase inverters onto an output of the DC power supply;
a smoothing capacitor configured to smooth an output from the inverter circuit which is connected to the inverter circuit in its subsequent stage via a first switch configured to switch between conduction and non-conduction; and
a shorting switch which has one end connected to the inverter circuit, and the other end connected to a negative terminal of the smoothing capacitor, wherein
DC/DC conversion is performed by utilizing charge/discharge of DC power in the inverter circuit, and
the inverter circuit is configured to control each single-phase inverter and the shorting switch such that reception and delivery of electric power of each DC voltage source of each single-phase inverter, is balanced.

2. The power conversion device according to claim 1, wherein the first switch is a rectifier diode.

3. The power conversion device according to claim 1, wherein the one end of the shorting switch is connected to a negative terminal of the DC voltage source of the single-phase inverter that is in the last stage of the plurality of single-phase inverters included in the inverter circuit.

4. The power conversion device according to claim 3, wherein, of the plurality of single-phase inverters, the single-phase inverter that is connected in the last stage includes a half-bridge inverter.

5. The power conversion device according to claim 1, wherein
in controlling each single-phase inverter and the shorting switch such that the reception and the delivery of the electric power of each DC voltage source of each single-phase inverter, is balanced, the inverter circuit is controlled by a plurality of control modes, each formed based on a combination of output control of each single-phase inverter and ON/OFF control of the shorting switch, and the control modes are set such that reception and delivery of electric power of each DC voltage source, the reception and delivery being caused by the output from each single-phase inverter, are balanced.

6. The power conversion device according to claim 5, wherein
each of the plurality of control modes has a boost ratio for DC/DC conversion, and
the boost ratio is selected by determining and switching to one of the control modes in accordance with the voltage of the DC power supply.

7. The power conversion device according to claim 6, wherein switching among the control modes is performed by selecting one of the control modes in a manner as to minimize variation of an output voltage of the power conversion device, the variation being caused by voltage variation of the DC power supply.

8. The power conversion device according to claim 6, wherein
the ratio of the voltages of the DC voltage sources of the single-phase inverters is variably set, and
the plurality of control modes are set such that the ratio of the voltages determined based on the control modes comprises several types.

9. The power conversion device according to claim 5, wherein in control using the control modes, the ratio of the voltages of the DC voltage sources of the single-phase inverters are adjusted by adjusting a duty ratio of positive and negative voltage outputs of each single-phase inverter without changing the control of the shorting switch.

10. The power conversion device according to claim 5, wherein
switching among the control modes is performed by comparing a voltage determination value set in advance with the voltage of the DC power supply, and
a hysteresis width is set for the voltage determination value.

11. The power conversion device according claim 5, wherein a predetermined control operation of the power conversion device is repeated in constant cycles, the predetermined control operation being based on the control modes which are each formed based on the combination of the output control of each single-phase inverter and the ON/OFF control of the shorting switch, and in one cycle of the predetermined control operation, reception and delivery of electric power of each DC voltage source, the reception and delivery being caused by the output from each single-phase inverter, are balanced.

12. The power conversion device according to claim 11, wherein the one cycle of the predetermined control operation includes at least two different control operation periods.

13. The power conversion device according to claim 12, wherein except for a case where each single-phase inverter does not generate voltage during the one cycle, the one cycle includes at least one control operation period during which each single-phase inverter outputs a positive voltage and at least one control operation period during which the single-phase inverter outputs a negative voltage.

14. The power conversion device according to claim 13, wherein in the one cycle, a total sum of the control operation periods during which each single-phase inverter outputs the positive voltage is equal in length to a total sum of the control operation periods during which the single-phase inverter outputs the negative voltage.

15. The power conversion device according to claim 1, wherein voltage values Vc (k) of a plurality (N pieces) of the DC voltage sources are set such that the ratio of the voltages is represented by powers of two $(1:2:4:2^{N-1})$.

16. The power conversion device according to claim 1, wherein, of voltage values Vc (k) of a plurality (N pieces) of the DC voltage sources, a maximum voltage Vc (N) and a minimum voltage Vc (1) satisfy an relational expression below, $$Vc(N) \leq (\Sigma Vc(k):k=1\sim N-1) + Vc(1).$$

17. A power conversion device comprising:
an inverter circuit
including one or more single-phase inverters which each include a bridge circuit wherein a diode is connected in series to a semiconductor switch device and a DC voltage source, and which are connected in series at their AC sides, and
having an AC side connected in series to an output of a DC power supply thereby to superimpose a total sum of outputs of the single-phase inverters onto an output of the DC power supply;
a smoothing capacitor configured to smooth an output from the inverter circuit which is connected to the inverter circuit in its subsequent stage via a first switch configured to switch between conduction and non-conduction; and
a shorting switch which has one end connected to the inverter circuit, and the other end connected to a negative terminal of the smoothing capacitor, wherein
DC/DC conversion is performed by utilizing charge/discharge of DC power in the inverter circuit, and
the inverter circuit is configured to control each single-phase inverter and the shorting switch such that reception and delivery of electric power of each DC voltage source of each single-phase inverter, is balanced.

18. The power conversion device according to claim 17, wherein the DC voltage source of each single-phase inverter includes a capacitor, and
the power conversion device further comprising
a voltage detector configured to detect a voltage of the DC power supply, wherein
the inverter circuit is subjected to output control in accordance with the voltage of the DC power supply and thereby a voltage of each capacitor is controlled.

19. The power conversion device according to claim 17, further comprising
a voltage detector configured to detect a voltage of the DC power supply, and to detect a voltage of the DC voltage source of each single-phase inverter, wherein
the inverter circuit is subject to output control in accordance with the voltage of the DC power supply, and
the shorting switch is switched ON unless voltages of the DC voltage sources all exceed respective setting voltage values, and the shorting switch is switched OFF when the voltages of the DC voltage sources exceed the respective setting voltage values.

20. The power conversion device according to claim 17, further comprising
a voltage detector configured to detect the voltage of the DC power supply, wherein
the inverter circuit is subject to output control in accordance with the voltage of the DC power supply and is controlled such that the charge/discharge of the DC power is switched upon switching ON/OFF the shorting switch.

21. The power conversion device according to claim 17, wherein the diode in the bridge circuit is a body-diode built in a MOSFET, and the MOSFET with the body-diode is connected in series to the semiconductor switch device.

* * * * *